US012530417B2

(12) United States Patent
Runer

(10) Patent No.: US 12,530,417 B2
(45) Date of Patent: Jan. 20, 2026

(54) MACHINE LEARNING BASED CONTENT SERVER WITH USER CATEGORIZATION AND EXPLORATION

(71) Applicant: Vortexplore Limited, London (GB)

(72) Inventor: Håkon Runer, London (GB)

(73) Assignee: Vortexplore Limited, London (GB)

( * ) Notice: Subject to any disclaimer, the term of this patent is extended or adjusted under 35 U.S.C. 154(b) by 12 days.

(21) Appl. No.: 18/729,060

(22) PCT Filed: Jan. 18, 2023

(86) PCT No.: PCT/EP2023/051139
§ 371 (c)(1),
(2) Date: Jul. 15, 2024

(87) PCT Pub. No.: WO2023/139129
PCT Pub. Date: Jul. 27, 2023

(65) Prior Publication Data
US 2025/0086241 A1   Mar. 13, 2025

Related U.S. Application Data

(60) Provisional application No. 63/300,508, filed on Jan. 18, 2022.

(51) Int. Cl.
*G06F 16/9535*   (2019.01)
(52) U.S. Cl.
CPC ............................. *G06F 16/9535* (2019.01)

(58) Field of Classification Search
CPC .................................................. G06F 16/9535
See application file for complete search history.

(56) References Cited

U.S. PATENT DOCUMENTS

| 2013/0124449 A1 | 5/2013 | Pinckney et al. |
| 2015/0178282 A1 | 6/2015 | Gorur et al. |
| 2019/0306105 A1 | 10/2019 | Snibbe |

OTHER PUBLICATIONS

International Search Report dated Mar. 20, 2023 issued for International PCT Application No. PCT/EP2023/051139.

*Primary Examiner* — Truong V Vo
(74) *Attorney, Agent, or Firm* — K&L Gates LLP

(57) ABSTRACT

A machine learning based content server with user categorization and exploration may be provided by system, comprising: a content library; a profile database; and a content server including a machine learning model trained to select content items from the content library for provision to users based on user profiles by performing operations comprising: identifying a current user category that a user currently belongs to, wherein the user profile lacks a characteristic associated by the machine learning model with the current user category; selecting a first content item based on the current user category and the lacking characteristic; providing the first content item to the user; receiving a reply indicating the reaction elicited by the first content item; updating the user profile based on the reaction; identifying a second content item based on the updated user profile; and providing the second content item to the user.

20 Claims, 8 Drawing Sheets

MACHINE LEARNING BASED CONTENT SERVER WITH USER CATEGORIZATION AND EXPLORATION

CROSS-REFERENCE TO RELATED APPLICATIONS

This application is a U.S. National Stage of International PCT Application No. PCT/EP2023/051139, filed on Jan. 18, 2023, which claims priority to U.S. Patent Application No. 63/300,508 filed Jan. 18, 2022, the entire disclosures of both of which are incorporated herein by reference.

BACKGROUND

Sequential content provision, such as with video streaming or music streaming services, often prioritizes user content preferences and qualitative assessments of the content items to provide a steam of similar or familiar content items to the users. Machine learning models may be used to build user profiles and serve content according to those user profiles so that different users who have expressed different preferences and qualitative assessments of content can receive different streams of content from the same service. Once a user profile is established, the machine learning model can then select content items for an individual users based on that user profile.

SUMMARY

The present disclosure is generally related to a content server with user and/or user group categorization and exploration. Content exploration allows the machine learning model to identify when a user's response to content is more likely to help better characterize the user or the user group, and thereby adjust how content items are provided. The machine learning model described in the present disclosure monitors the reactions elicited from users by the various content items provided to those users. The machine learning model identifies when an atypical reaction is elicited from a user, and adjusts the provision of content items to that user to explore additional reactions from the user. The machine learning model may re-categorize the user based on the additional reactions or probe for further information to better categorize the user for the future provision of additional content items that are different from previously provided content items, but still relevant to the user.

Accordingly, the present disclosure provides a targeted approach for machine learning model retraining and data gathering for a content server, which improves the computational efficiency of the computing devices used to assess and provide content to users, reduces the need for exploratory feedback, enables operation in new use spaces, and improves the user experience, among other benefits.

One embodiment of the present disclosure is a system, comprising: a content library including a plurality of content items; a profile database including a user profile associated a user; and a content server including a machine learning model trained to select content items of the plurality of content items from the content library for provision to the user based on the user profile by performing operations comprising: identifying, via the machine learning model, a current user category out of a plurality of user categories that the user currently belongs to, wherein the user profile is lacking a characteristic associated by the machine learning model with the current user category; selecting, via the machine learning model, a first content item from the plurality of content items based on the current user category and the characteristic lacking from the user profile; providing the first content item to the user; in response to completing provision of the first content item to the user, receiving a first reply indicating what reaction the first content item elicited from the user; updating, via the machine learning model, the user profile to an updated user profile based on a value for the characteristic associated with the reaction elicited from the user by the first content item; identifying, via the machine learning model, a second content item from the plurality of content items based on the updated user profile; and providing the second content item to the user.

One embodiment of the present disclosure is a method, comprising: receiving a user profile associated with a user, wherein the user profile is incomplete; identifying, via a machine learning model according to the user profile, a first content item from a plurality of content items, wherein the first content item is historically associated with: a first reaction from users classified with a first user category that the user belongs to according to the user profile, and a second reaction from users classified within a second user category that the user does not belong to according to the user profile; providing the first content item to the user; receiving a reply from the user indicating which one of the first reaction or the second reaction the first content item elicited from the user; and in response to the reply indicating that the first content item elicited the second reaction from the user, identifying, via the machine learning model, a second content item from the plurality of content items, wherein the second content item is identified from the plurality of content items as being associated with probative reactions related to a probative characteristic missing from the user profile used by the machine learning model to classify the user between the first user category and the second user category.

One embodiment of the present disclosure is a method, comprising: identifying, via a machine learning model, a user who can be assigned to one of a first user category or a second user category based on a user profile associated with the user, wherein the user profile is incomplete; identifying a probative characteristic that is missing from the user profile, wherein the machine learning model classifies the user into the first user category when the probative characteristic is assigned a first value and classifies the user into the second user category when the probative characteristic is assigned a second value, different than the first value, wherein: the first value is associated with a first reaction from users classified within the first user category, and the second value is associated with a second reaction from users classified within the second user category; identifying a content item from a plurality of content items that is historically associated eliciting one of the first reaction or the second reaction; and providing the content item to the user.

One embodiment of the present disclosure is a method, comprising: identifying a first user category used by a machine learning model to select content items from a content library for users belonging to the first user category; identifying a distribution of historical reactions to a first content item provided by the machine learning model to the users belonging to the first user category; identifying atypical reactions for the first content item from the distribution of historical reactions according to a typicality threshold; linking follow up actions for the atypical reactions to the first content item for the machine learning model to select an exploratory content item associated with: a first reaction from the users belonging to the first user category identified as a first one of atypical or typical, and a second reaction from different users belonging to a second user category identified as a second one of atypical or typical different than the first one; and in response to receiving an atypical reaction elicited by the first content item, providing the exploratory content item to a user.

BRIEF DESCRIPTION OF THE DRAWINGS

The accompanying figures depict various elements of the one or more embodiments of the present disclosure, and are not considered limiting of the scope of the present disclosure.

In the Figures, some elements may be shown not to scale with other elements so as to more clearly show the details. Additionally, like reference numbers are used, where possible, to indicate like elements throughout the several Figures.

It is contemplated that elements and features of one embodiment may be beneficially incorporated in the other embodiments without further recitation or illustration. For example, as the Figures may show alternative views and time periods, various elements shown in a first Figure may be omitted from the illustration shown in a second Figure without disclaiming the inclusion of those elements in the embodiments illustrated or discussed in relation to the second Figure.

Figure 1:
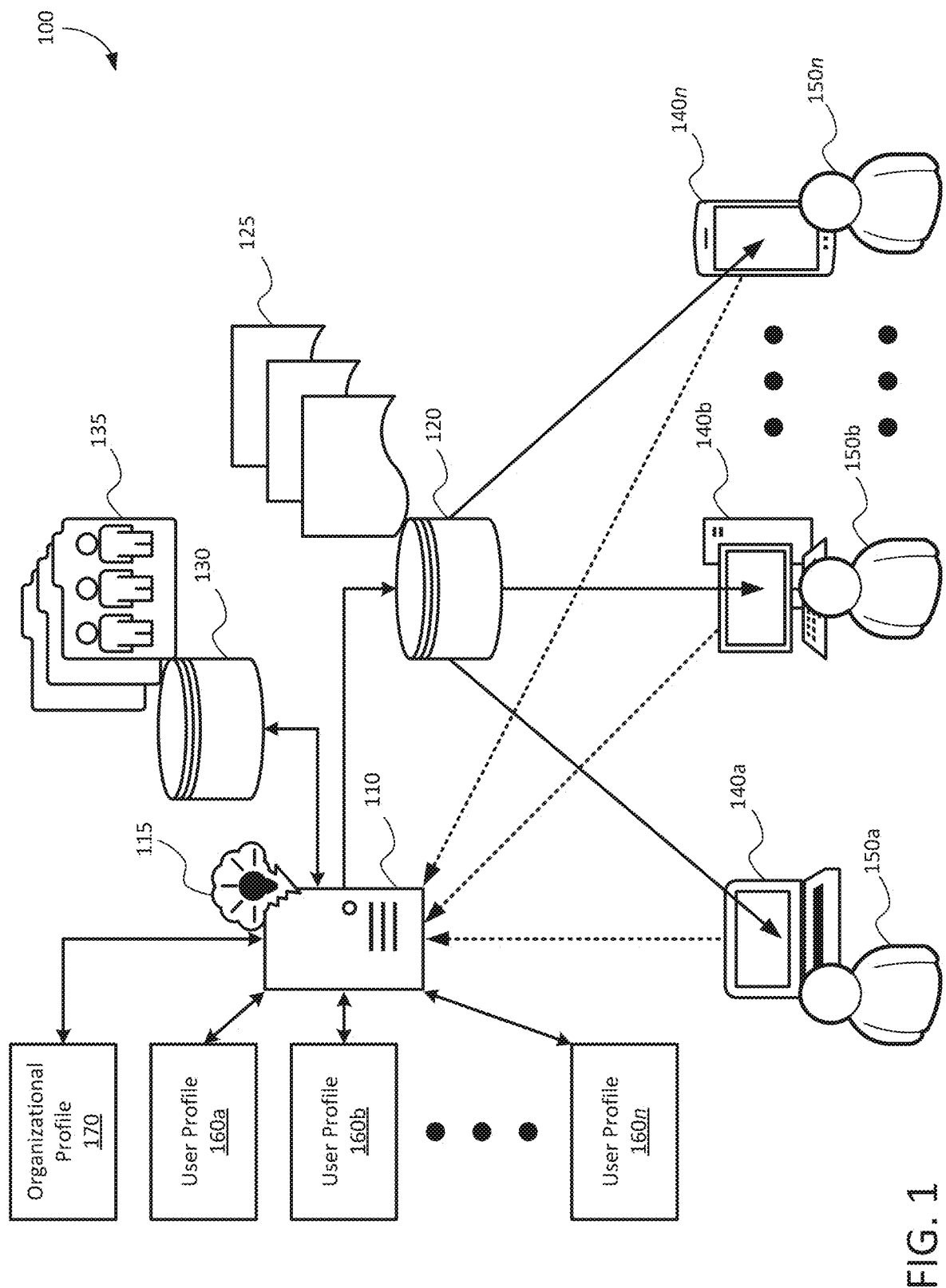

FIG. 1 illustrates a content provision environment, according to embodiments of the present disclosure.

Figure 2:
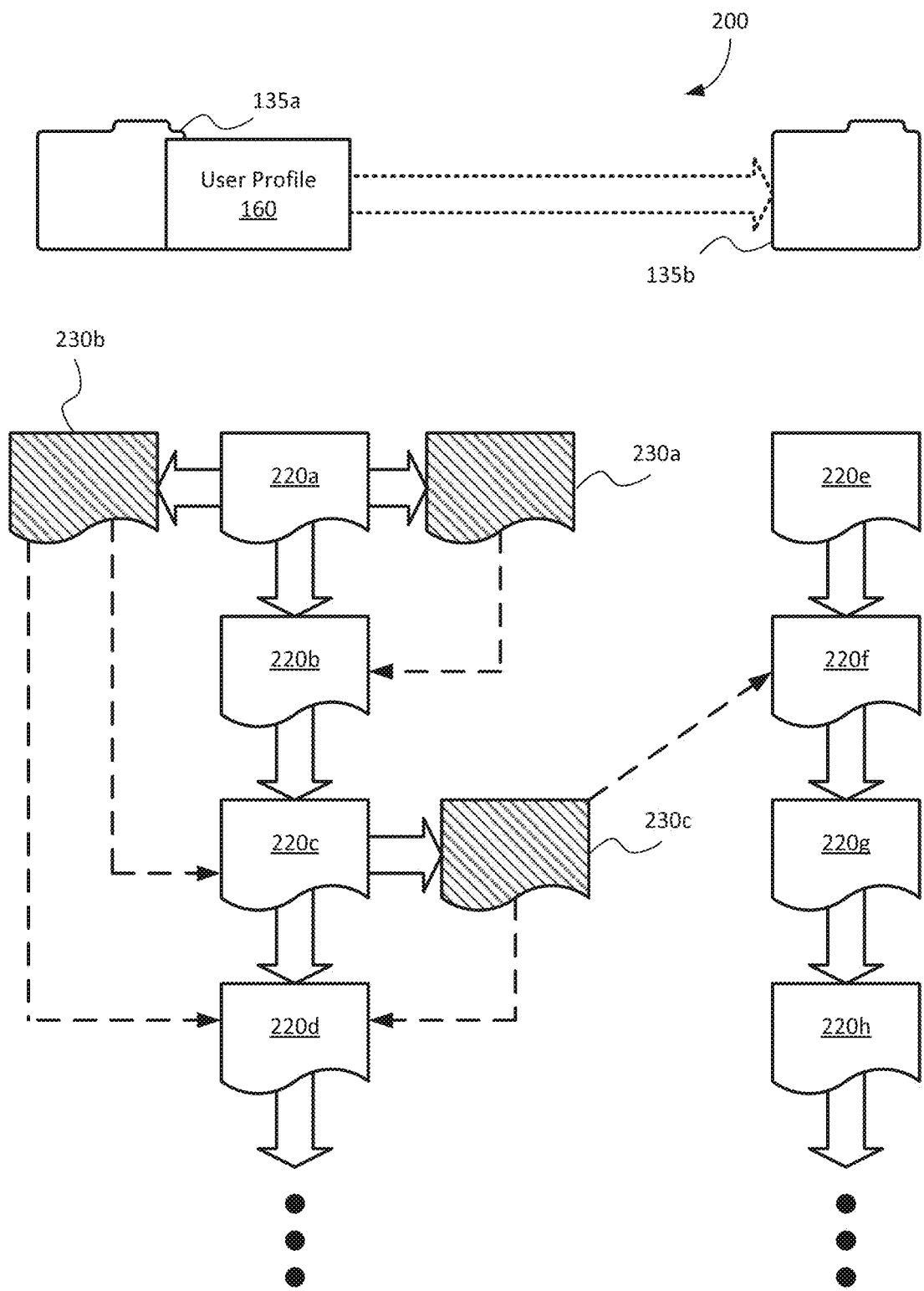

FIG. 2 illustrates a customizable content tree, according to embodiments of the present disclosure.

Figure 3A:
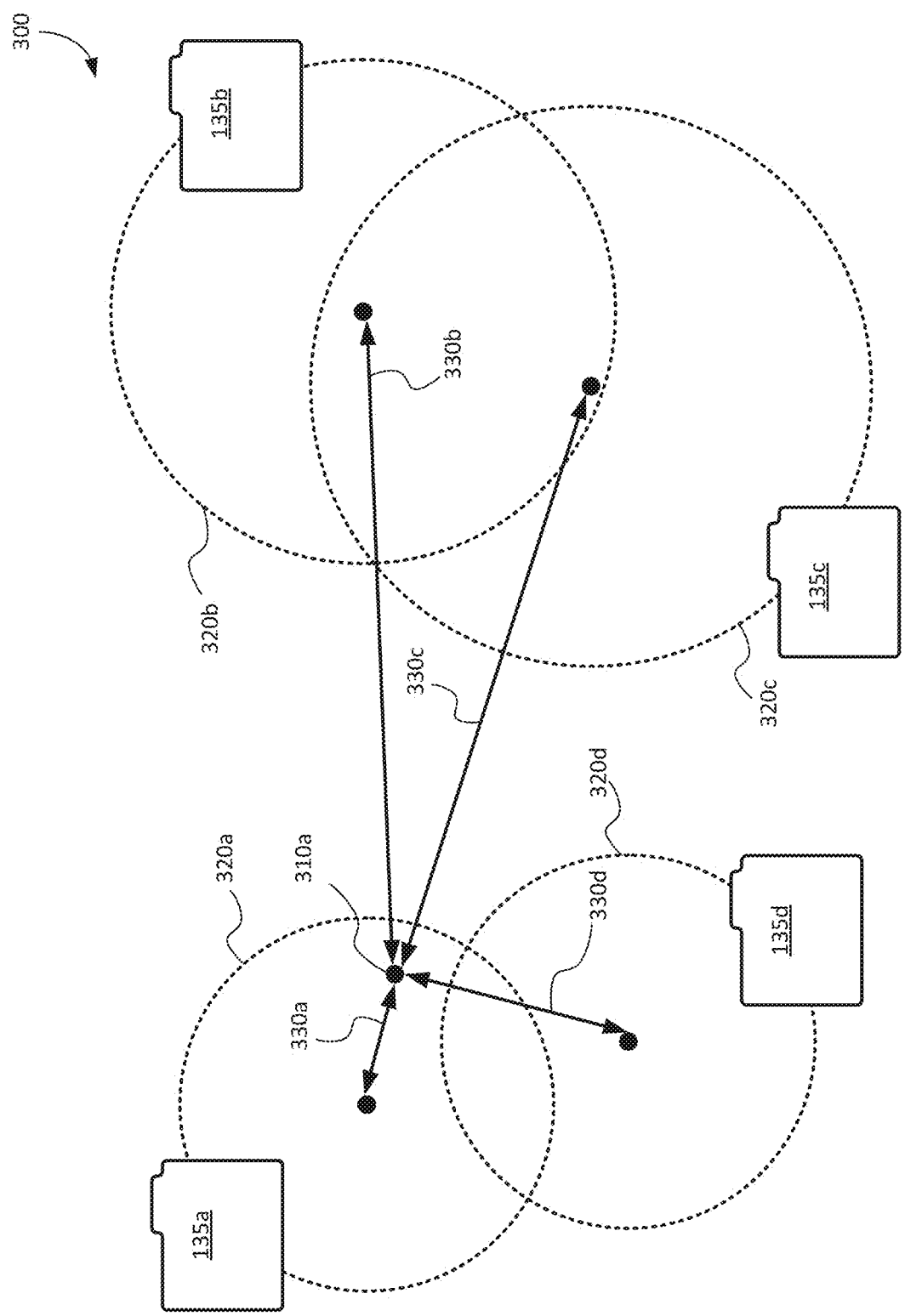
Figure 3B:
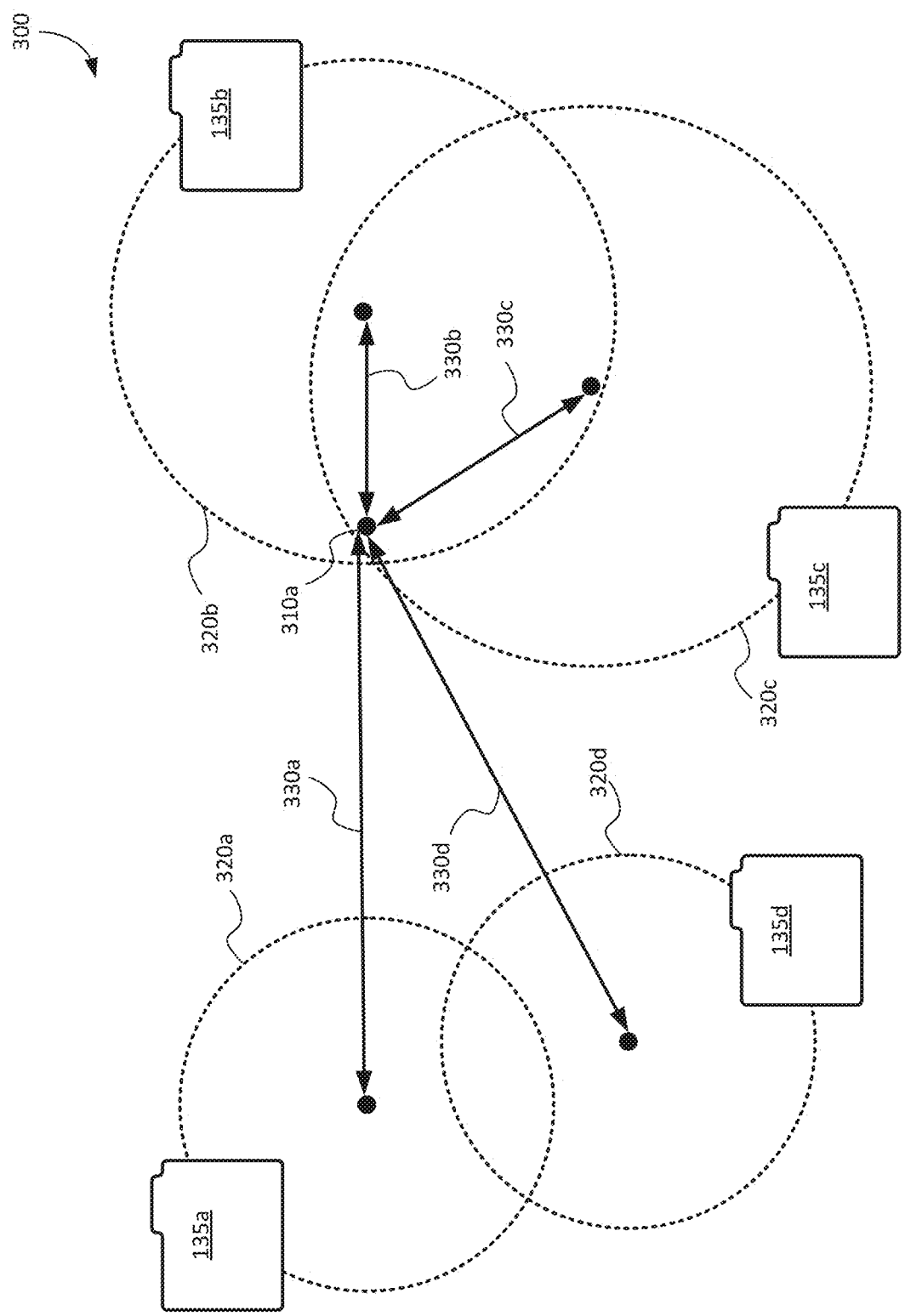

FIGS. 3A and 3B are two-dimensional representations of stored data structures used by the machine learning model, according to embodiments of the present disclosure.

Figure 4:
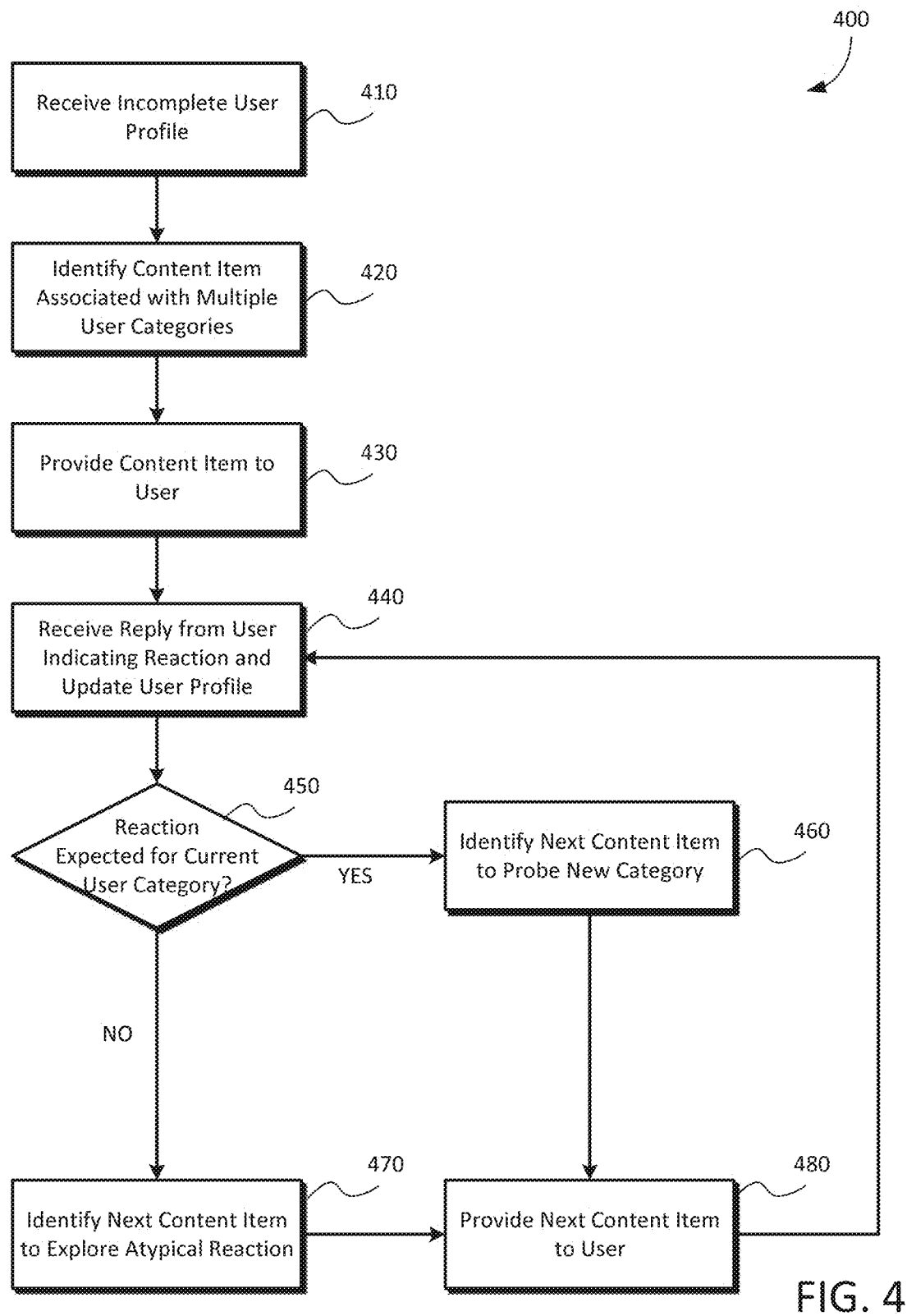

FIG. 4 is a flowchart of a method for identifying when and what exploratory content to provide in an ongoing content sequence, according to embodiments of the present disclosure.

Figure 5:
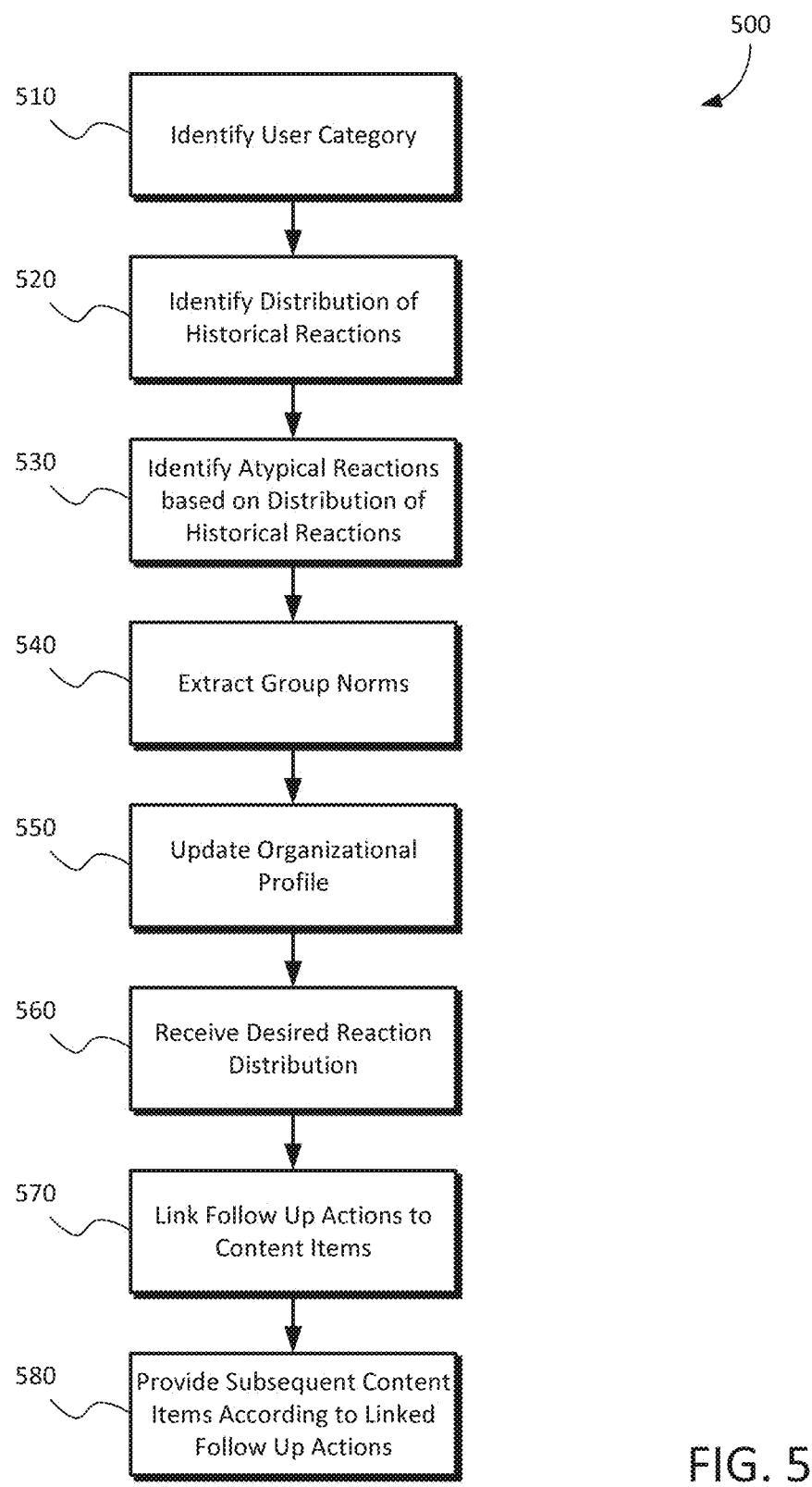

FIG. 5 is a flowchart of a method for identifying norms for a user category against which reactions from individual users are tracked, according to embodiments of the present disclosure.

Figure 6:
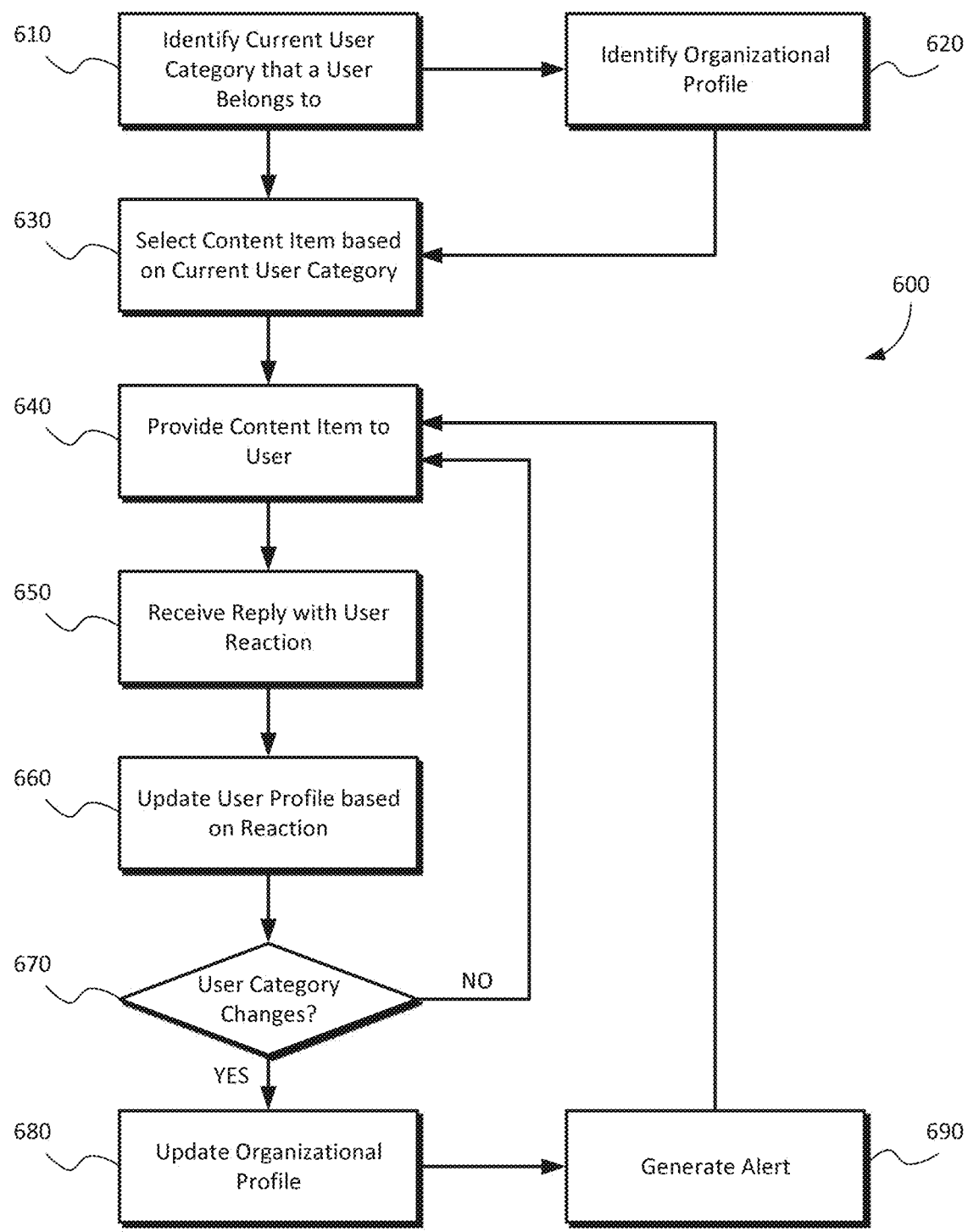

FIG. 6 is a flowchart of a method for reacting to changes in categorization of the users while serving an ongoing content sequence, according to embodiments of the present disclosure.

Figure 7:
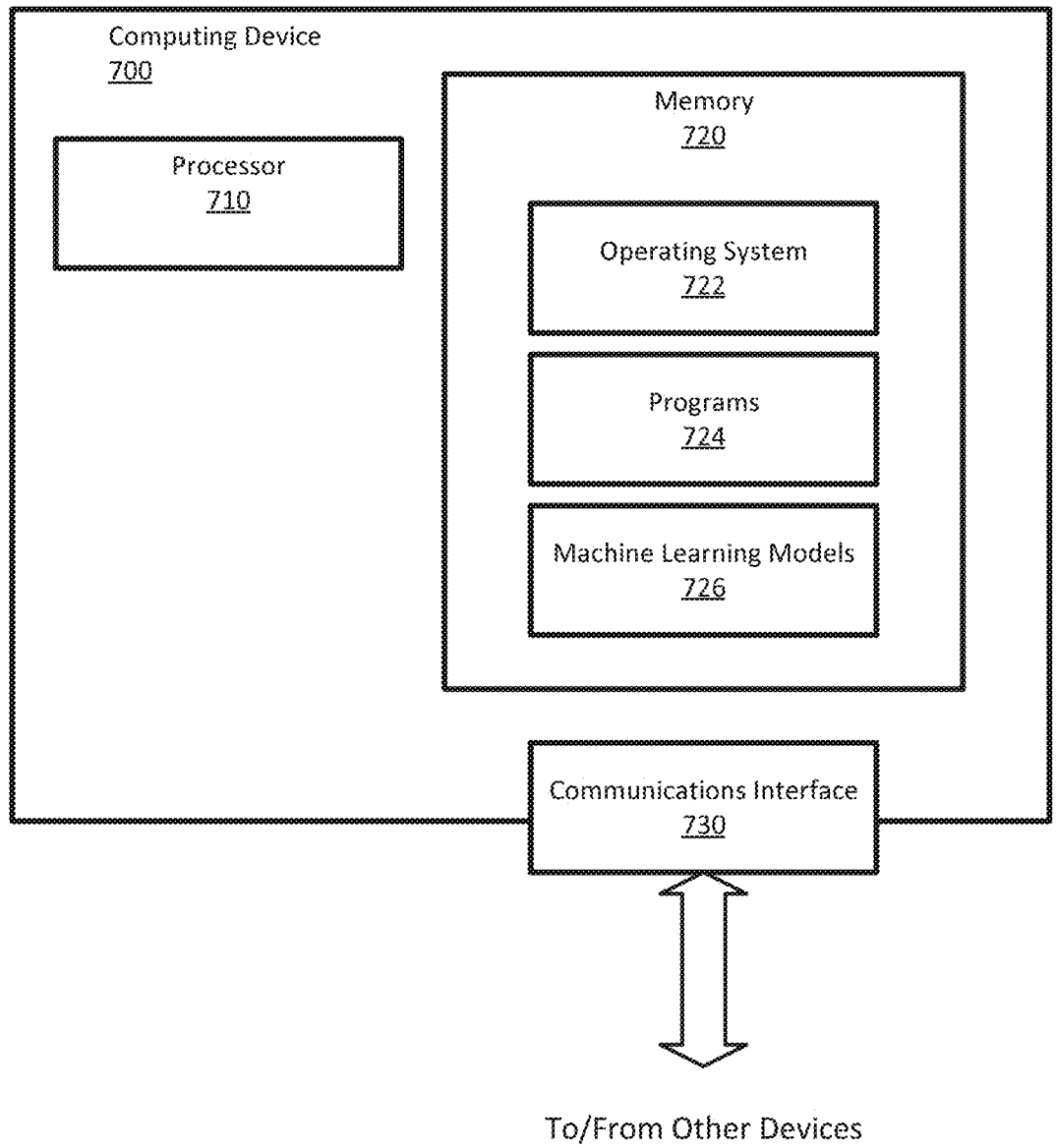

FIG. 7 illustrates physical components of a computing device, according to embodiments of the present disclosure.

DETAILED DESCRIPTION

The present disclosure is generally related to a content server with user categorization and exploration to identify when changes to a content stream should be explored or imparted for a user. Although user profiles generated and used by machine learning models may excel at identifying similar items to previously liked content items, identifying new or different content items that are still relevant to a user remains a challenge.

Similarly, updating the user profile as the user's preferences change over time can be difficult, as machine learning models may over fit the training data and leave content provision in a loop, where the content server repetitively provides previously liked content to the user, and fails to identify new or different content. Although genetic algorithms may be used to randomly identify new content items outside of these loops (which may then be assessed to modify a user profile), these algorithms are slow to react, consume significant computing resources with marginal benefit to the end user, and are generally frustrating to users when randomly selected content (e.g., training data) are provided with no regard to the users' preferences. Additionally, manual editing of a user profile may have unintended consequences, and the machine learning model that uses the user profile to provide content may react in unexpected ways when new data are added or existing data are removed from an existing user profile.

Moreover, user profiles generated based on the user's preferences and quality assessments of past content item may be inappropriate or ineffective when applied to content that the user may be otherwise uninterested in consuming or not care about the quality of. For example, users may not wish to consume training videos or assessment videos, or may find them corny or otherwise of a low production quality, all of which are unrelated to the effectiveness of those videos in conveying content or gathering responses from the users. Accordingly, using user profiles developed based on user preferences for past content items can be ineffective for identifying different content items to provide in the future that the user (or third party) can benefit from despite the user not "liking" the content items provided.

The content server of the present disclosure therefore uses a machine learning model that classifies or categorizes the users into various user categories for content provision. When a user provides a reaction that is unexpected or otherwise atypical for the current user category, the machine learning model adjusts provision of the content items to collect further data related to that user and (potentially) reclassifies that user and provides a different set of content items to that user. For example, when providing a stream of training videos related to network security to a user initially classified as a "novice user", and the user reacts more similarly to an "expert user", the content server can switch the ongoing stream to provide training videos more appropriate to an expert, to thereby keep the user engaged with the provided content, provide more relevant content, or reduce the amount of content needed to be served to the user to complete a training goal. Similarly, if an expert user provides a response more typical for a novice user, the machine learning model may switch the ongoing stream to provide training videos that provide greater nuance to identify why the expert user reacted in an unexpected way to the earlier video, and potentially provide more novice-appropriate training videos to the user previously categorized as an expert.

Moreover, by monitoring how groups of users are categorized, or how those users shift in categorization over time, the machine learning model can create and update organizational profiles to track shifts or trends in group behavior and composition. The machine learning model can use the overall distribution of users tracked in the organizational profile to identify content items to provide to the group as a whole (e.g., as a shared starting point for individualized streams of content), or for identifying insights on the changing dynamics within the group.

Accordingly, the present disclosure provides a targeted approach for how to provide content from a content library using a user profile. The targeted approach provides more relevant content items to explore how different users react to the content items when those reactions are atypical for the currently assigned category for those users. By identifying when and how a user reacts atypically, the machine learning model can provide exploratory content items that are more relevant (and provides at times that are more relevant) than previous exploratory approaches. Additionally, the machine learning model may be used in additional environments beyond user-preference driven or organizational-mandated content selection, but may be used in a holistic organizational-and-user driven content selection context. By using the approaches described herein for a machine learning model for content provision, the present disclosure improves the computational efficiency of the computing devices used to assess and provide content to users, reduces the amount of exploratory prompts needed, improves the quality of the responses to the exploratory prompts, enables operation in new use contexts, and improves the user experience, among other benefits.

FIG. 1 illustrates a content provision environment 100, according to embodiments of the present disclosure. A machine learning model 115 is provided on a content server 110 to select various content items 125 from a content library 120 for provision. In various embodiments, the content server 110 and the content library 120 may be provided as one or more computing devices (which may be combined or separate from one another). Example hardware as may be included in the content server 110 and the content library 120 is discussed in greater detail in regard to the computing device 700 illustrated in FIG. 7. Although generally discussed as a singular model, in various embodiments, the machine learning model 115 may be the actively selected analysis model from several individual models trained for different domains or different purposes that are algorithmically controlled or linked to provide an Artificial Intelligence (AI) package as part of a software suite or computer program product for content recommendation and provision.

Various user devices 140*a-n* (generally or collectively, user device 140) receive the selected content items 125 and output the selected content items 125 to corresponding users 150*a-n* (generally or collectively, user 150). In various embodiments, the user devices 140 may receive the content items 125 from the content library 120, the content server 110, or various distributed Content Delivery Networks (CDN). The user devices 140 may include various different types of computing devices, and example hardware as may be included in the user devices 140 is discussed in greater detail in regard to the computing device 700 illustrated in FIG. 7.

The user devices 140 receive reactions from the users 150 elicited by the content items 125, and provide these reactions back to the machine learning model 115. The machine learning model 115 builds and maintains user profiles 160*a-n* (generally or collectively, user profile 160) for each associated user 150*a-n*, which are used to identify further content items 125 to provide to the individual users 150 when providing a series or a stream of content. Rather than building the user profile 160 based only on user-provided likes/dislikes or other feedback inputs for the enjoyment that the user 150 assigns to a given content item 125, the machine learning model 115 uses reactions to the content items 125 (which may be augmented with feedback related to the content items 125) and a classification of a user category 135 for that user profile 160 to identify which content item 125 to serve next, and to identify when to serve exploratory or probative content items 125 to refine or update the user profile 160.

In various embodiments, the content items 125 include video clips, audio clips, still images, Augmented Reality (AR) or Virtual Reality (VR) images, text, metadata (e.g., closed captioning/subtitles) and combinations thereof that are selected by the machine learning model 115 for provision to the user 150 in a stream of sequential content items 125. For example, a user 150 or the machine learning model 115 may select a first content item 125 to consume, and the machine learning model 115 provides the user 150 with a second, third, fourth, etc., content item 125 without receiving further selective input from the user 150. In another example, the machine learning model 115 can select a content item 125 of a video clip and a content item 125 of a question for the user 150 to answer related to the content of that video clip to combine into a single content item 125 for provision to a certain user 150.

As used herein, selective input (also referred to as selections) are contrasted against reactive input (also referred to as reactions), in which a selective input directly specifies a desire or a command to view, receive, or otherwise consume a specified next content item 125, and in which a reactive input identifies how the user 150 interpreted, felt about, or otherwise reacted to a current or previously provided content item 125.

For example, consider a stream of three content items 125 provided as first, second, and third video clips in sequence to a user 150, which show several persons attempting to address a potential computer security breach. Selective inputs (which are generated by the machine learning model 115 and not received from the user 150 in the present example) identify which video clips to play and in which order, while the reactive inputs indicate how the user 150 responds to what is occurring in the video clips as they are presented. In various embodiments, the machine learning model 115 uses reactive inputs from the user 150 to help determine what video clip to play next. These reactive inputs may include indications that a user 150 believes the characters in the video clip reacted appropriately/inappropriately, whether the user 150 was confused by or understood the concepts presented in the video clip, whether the user 150 correctly identified the root cause for the security breach illustrated in the video clip, etc. The reactions may be based on various scales including binary scales (e.g., true/false; yes/no; agree/disagree; etc.), numerical scales (e.g., X out of Y stars; zero to ten; strongly agree, weakly agree, neutral, weakly disagree, strongly agree; etc.), positional scales (e.g., which of Alice, Bob, or Carol is most correct; whether the error occurred in module A, B, or C; the least preferred setting for the firewall; etc.), and combinations thereof.

Depending on the capabilities of the user devices 140 to collect different reaction data, the type of content items 125 provided to the users 150, and what data an operator wishes to process to identify sequential content items 125, the machine learning model 115 may collect various data related to the reactions elicited by the content items 125. The reactive inputs may be received from the user 150 via user interface selections (e.g., the user 150 selects option A via a user interface, the user 150 types in a freeform answer), spoken responses (e.g., a speech recognition service identifies the contents of utterances from the user 150), via facial recognition (e.g., the face of the user 150 displays a confused expression, the gaze of the user 150 wanders during playback indicating boredom), via biometric monitoring (e.g., an elevated heartrate of the user 150 indicating excitement), via time monitoring (e.g., a fast response time indicating guessing rather than consideration of a response, a slow response time indicating confusion), and combinations thereof.

Continuing the example, when the user 150 supplies reactive inputs (during or on conclusion of a video clip), the machine learning model 115 may use the reactions to the earlier consumed video clips when selecting the next video clip. For example, when the first video clip shows the characters Alice, Bob, and Carol each suggesting a course of action to handle a potential phishing email, and a first user 150*a* reacts by stating that Alice suggested the best course of action, the machine learning model 115 may select the second video clip to show the results of Alice's suggestion instead of video clips that show the results of Bob or Carol's suggestions. However, if the second user 150*b* also reacts by selecting Alice's suggestion as the best course of action, but this reaction is atypical or otherwise unexpected for the second user 150*b* (e.g., based on the user category 135 that the second user 150*b* currently belongs to), the machine learning model 115 can instead select a different video clip to present as the second video clip (e.g., an exploratory or probative content item 125). In another example, if the nth user profile 160*n* indicates that the nth user 150*n* often ignores or minimizes suggestions from persons like Carol, the machine learning model 115 can select the second video clip to show the results of Carol's suggestion despite the nth user 150*n* also providing a reaction input indicating that Alice's suggestion was judged to be the "best". Accordingly, the machine learning model 115 can use the same inputs to provide different outputs to different users 150 and without the users 150 supplying selective inputs based on the reactions and user profiles 160 of those users 150.

Reactive input may further be understood as separate and distinct from feedback input (also referred to as feedback), which identifies quality assessments or preference assessments from a user 150 for a related content item 125. Accordingly, a user 150 may provide feedback input that indicates whether a content item 125 is well-made, enjoyable to consume, includes high-quality images and audio, etc., but also provides a separate reaction to the substance of the content item 125. Continuing the earlier example, a first user 150*a* and a second user 150*b* belonging to the same user category 135 may both indicate in the feedback input that a content item 125 was well-made, but indicate different reactions to which person among Alice, Bob, and Carol suggested the better solution. Similarly, a first user 150*a* and a second user 150*b* belonging to the same user category 135 may both react to a content item 125 indicating that Alice provided the best solution, but provide different feedback inputs for whether the content item 125 was well-made. In another example, a user 150 may provide a single input that the machine learning model 115 interprets separately as feedback and as a reaction so that when the user 150 indicates whether a content item 125 was subjectively enjoyable (e.g., feedback) is separately understood from whether the user 150 was objectively expected to enjoy the content item 125 as indicated by the input (e.g., reaction).

The machine learning model 115 can use the feedback received from an individual user 150 or an aggregated group of users 150 in addition to the reactions elicited from one or more users 150 to adjust how unexpected reactions are handled. For example, if a user 150 provided an unexpected reaction to a content item 125 identified as confusing or unclear to that user 150 due to associated feedback, that reaction may be given less weight in determining whether to reclassify what user category 135 the user 150 belongs to when compared to an unexpected reaction to a content item 125 identified as clear and unambiguous by that user 150. Similarly, an atypical reaction to a content item 125 marked as confusing or ambiguous by at least a threshold percentage of previous users 150 may be given less weight than an atypical reaction to a content item 125 marked as clear or unambiguous when determining whether to serve different content items 125 in an ongoing stream.

In various embodiments, the user categories 135 are initially deployed based on an organizational context for a group or organization that the users 150 belong to and various individual demographic details for the users 150. For example, the machine learning model 115 may use an organizational context of length of employment, location of employment, and role (e.g., manufacturing, management, ancillary services) to group new manufacturing hires in factory A in a separate user category 135 from veteran management in factory B. In another example, the machine learning model 115 may use an organizational context of serving video of various types to different viewers, and supplied demographic information of age, gender, and language spoken to identify categories of users 150 expected to enjoy English-language cartoons, English-language live action television, French-language films, etc.

By observing when a user 150 deviates from an expected reaction within the user category 135 currently assigned to the user profile 160, the machine learning model 115 can adjust what user category 135 a user 150 is categorized into, develop new user categories 135 when multiple users 150 demonstrate unique reaction patterns from existing categories, and remove or deprecate existing user categories 135 when the number of users 150 categorized therein falls below a membership threshold.

For example, when a user 150 initially classified in a user category 135 as being expected to like French-language films and to dislike English-language cartoons reacts positively to an English-language cartoon or negatively to a French-language film (and thus unexpectedly for the current user category 135), the machine learning model 115 can identify that the user profile 160 is potentially assigned to an non-representative current user category 135.

In another example, when users 150 are initially classified into user categories 135 based on length of service, location, and role, and at least a threshold percentage of the users 150 that are classified in a "manufacturing" role demonstrate similar reactions to similar content items 125 over time regardless of length of service or location, the machine learning model 115 can combine the user categories 135 for "new hire/manufacturing/factory A", "new hire/manufacturing/factory B", "veteran/manufacturing/factory A", and "veteran/manufacturing/factory B" into one user category 135 for "manufacturing".

A profile database 130 stores the various user profiles 160, an organizational profile 170, and a plurality of user categories 135 that the users 150 may be classified into. The machine learning model 115 accesses the user profiles 160 to identify content items 125 to serve, and tracks changes in membership and distribution of users 150 within the various user categories 135 to develop an organizational profile 170. The organizational profile 170 may be used to identify themes across a group or subgroup of users 150, including trends of shifting categorization among the available user categories 135. Although one organizational profile 170 is illustrated, the machine learning model 115 may use multiple organizational profiles 170 to monitor groups and subgroups of users 150, and one user 150 may be monitored across multiple different organizational profiles 170.

In some embodiments, the organizational profile 170 can identify a distribution of a plurality of users 150 among the various user categories 135 to aid the machine learning model 115 to identify an initial content item 125 to provide as a shared starting point to several users 150. For example, when the users 150 are clustered into "experienced" and "inexperienced" user categories 135, the organizational profile 170 can help identify a content item 125 that can help distinguish users 150 (potentially with incomplete user profiles 160) into one of the two categories to receive better tailored content from the associated user category 135. In another example, when serving content items 125 to users 150 clustered into one user category 135, the machine learning model 115 can select probing content items 125 to attempt to elicit atypical reactions for the currently assigned user category 135 that are more typical for a different user category 135 to see if one or more users 150 are currently miss-categorized or if the current user category 135 should be split into multiple user categories 135 with separate content recommendations.

In some embodiments, the organizational profile 170 can be used to track trends in a user base so that, for example, when a threshold number of users 150 tracked by the organizational profile 170 have been identified as being reassigned to new user categories 135, the machine learning model 115 can generate an alert to indicate changing behaviors in an organization. Similarly, when the organizational profile 170 indicates that a threshold number of users 150 tracked by the organizational profile 170 have provided unexpected responses to a particular content item 125, the machine learning model 115 may generate an alert to identify concerns with the associated relationships between content items 125 and user categories 135 or a behavioral anomaly in the organization.

For example, when the content items 125 are video clips that are provided as part of a survey to assess organizational-wide behaviors or readiness (e.g., a cybersecurity audit), the organizational profile 170 for a manufacturing plant can indicate the organizational context and user categories 135 for each user 150 within than manufacturing plant. Accordingly, the machine learning model 115 can identify a first content item 125 to provide in a stream to all of the users 150 within that plant receiving the survey as a shared starting point to evaluate all of the user 150 from, but that is customized to the distribution and expected experience levels of the users 150 across the organization.

For example, the machine learning model 115 may select different content items 125 to initially provide to users 150 within the example manufacturing plant than to users 150 located at a data center in the same organization. Similarly, the machine learning model 115 may select different content items 125 to users 150 in the manufacturing plant than if the readiness assessment were provided to the entire organization that the manufacturing plant and the data center both belong to.

After starting at the shared baseline, the machine learning model 115 can then use the different reactions from the individual users 150 to customize what next content items 125 are served to the individual users 150 as the content stream progresses. In various embodiments, the content item 125 selected as the shared starting point may be a content item 125 historically associated with differentiating the users 150 into various user categories 135 to thereby more rapidly identify the different user categories 135 and to provide customized content accordingly.

FIG. 2 illustrates a customizable content tree 200, according to embodiments of the present disclosure. The machine learning model 115 can customize the content items 125 provided to users 150 based on the associated user profiles 160 and the organizational profile 170 to select two or more divergent pathways 210*a-b* (generally or collectively, pathway 210) for different users 150 to explore different aspects of user experience, knowhow, or insights particular to a certain user 150. As the content items 125 elicit reactions from the users 150, the machine learning model 115 identifies what content item 125 to provide next to each of the users 150, and may update the associated user profiles 160 accordingly.

As is illustrated in FIG. 2, the first pathway 210*a* includes a first plurality of typical content items 220*a-d* (generally or collectively, typical content items 220) and the second pathway 210*b* includes a second plurality of typical content items 220*e-h* that are each provided in sequence when users 150 react typically for an associated user category 135. The typical content items 220 in the first pathway 210*a* are associated with a first user category 135*a*, and the typical content items 220*e-h* in the second pathway 210*b* are associated with a second user category 135*b* such that when a user 150 classified in a given user category 135 reacts as expected, the machine learning model 115 provides the next typical content item 220 in the associated pathway 210.

If the user 150 provides reactions typical for users 150 assigned to the first user category 135*a* for each content item 125 selected by the machine learning model 115, the user 150 will be provided with the first through fourth typical content items 220*a-d*. In contrast, a user 150 with a user profile 160 initially assigned to the second user category 135*b* who provides typical reactions for users 150 assigned to the second user category 135*b* will be provided with the fifth through eighth typical content items 220*e-h*.

Although discussed as a "sequence", in various embodiments the content items 125 included in a given pathway 210 may be a curated and preselected set of typical content items 220 that are known a priori, or may be selected on the fly by the machine learning model 115 in response to receiving a reply indicating what reaction a previous content item elicited from the user 150. For example, the machine learning model 115 may be instructed (before providing the first typical content item 220*a*) to provide the first through fourth typical content items 220*a-d* to users 150 in the first user category 135*a* who provide typical responses. In another example, the machine learning model 115 may determine after providing the first typical content item 220*a* which content item 125 from the content library 120 to provide next as the second typical content item 200*b*. Accordingly, the machine learning model 115 may develop the pathway 210 during content provision, may use pre-arranged sequences of content, and combinations thereof when determining what content items 125 to serve to the various users 150.

However, when the user 150 indicates that a content item 125 elicited a reaction atypical for the current user category 135, the machine learning model 115 may insert exploratory content items 230*a-b* (generally or collectively, exploratory content item 230) into the sequence of typical content items 220. These exploratory content items 230 may also be selected a priori or on the fly as the sequence of content items 125 are provided to the user 150. The exploratory content item 230 that are selected a priori may be provided follow-ups to explore nuance in a response that, although atypical, may be anticipated for a subset of the users 150 (e.g., a "best" response based on outdated standards that is now atypical). The exploratory content items 230 that are selected on the fly may be based on previous user classifications and other data within the associated user profile 160 so that two users 150 who supply the same atypical reaction to the same typical content item 124 may be provided with different exploratory content items 230 by the machine learning model 115.

Additionally, the exploratory content items 230 may be provided as additional content within the pathway 210, as a branching point to a different pathway 210, or as an alternative flow within the current pathway 210.

For example, when the first typical content item 220a elicits a reaction from the user 150 that is atypical for users 150 categorized in the first user category 135a, the machine learning model 115 may provide a first exploratory content item 230a to collect additional details from the user 150 for why the atypical response was elicited. Accordingly, the machine learning model 115 can use the exploratory content items 230 to collect additional data for a given user 150.

In another example, when the first typical content item 220a elicits a reaction from the user 150 that is atypical for users 150 categorized in the first user category 135a, the machine learning model 115 may provide a second exploratory content item 230b as an alternative track within the first pathway 210a. Depending on the reaction to the second exploratory content item 230b, the machine learning model 115 may proceed to a different points of the first pathway 210a (if generated a priori) or adjust what subject matter to present to the user 150 (if generated on the fly). Accordingly, the machine learning model 115 can use the exploratory content items 230 to identify when to avoid various content items 125 (e.g., as irrelevant to a user 150 or expected to provide no additional inputs of value) or focus on various content items 125 of greater importance (e.g., skipping less important content items 125 when serving content under a time limit, presentation limit, or to work within the attention span of the user 150).

In another example, when the third typical content item 220c elicits a reaction from the user 150 that is atypical for users 150 categorized in the first user category 135a, the machine learning model 115 may provide a third exploratory content item 230c to determine whether the user profile 160 is correctly categorized into the first user category 135a, or a second user category 135b would be a more appropriate categorization for the user profile 160. Depending on the reaction elicited from the third exploratory content item 230c, the machine learning model 115 may return to providing content from the first pathway 210a (associated with the first user category 135a) or switch to proving content from the second pathway 210b, and may reassign the user profile 160 from the first user category 135a to the second user category 135b.

The typical content items 220 and the exploratory content items 230 may be any of the content items 125 discussed in relation to FIG. 1. Additionally, a content item 125 classified as an typical content item 220 in a first pathway 210a may be classified as an exploratory content item 230 in a second pathway 210b, and vice versa, or may be a content item 125 that is unassociated with a content pathway 210. Additionally, because the machine learning model 115 may combine various content items 125, two different typical content items 220 or exploratory content items 230 may include identical sub-elements. For example, the first typical content item 220a and the fifth typical content item 220e may include an identical video clip, but include different questions related to that video clip.

In one use example, when the typical content items 220 are video files for entertainment, and the reactions indicate how much a user 150 liked a certain content item 125 (or an aspect of the content item 125), the machine learning model 115 may initially provide a first typical content item 220a to users 150 assigned to the first user category 135a that the machine learning model 115 expects those users 150 to like. When the first typical content item 220a elicits an expected reaction of "generally liked" from a first user 150a, the machine learning model 115 selects and provides the second typical content item 220b to the first user 150a on conclusion of the first typical content item 220a. Although the present example uses like/dislike, any sort of rating or evaluation (e.g., too long/short, too slow/fast, wrong language, too easy/hard) may be used as reaction data (and/or as feedback data) with various nuance (e.g., like/dislike the genre/actor/length/etc.), and other examples are provided in the present disclosure that use different reaction criteria.

However, in the present example, if the first typical content item 220a elicits an unexpected reaction of "greatly liked" from a second user 150b, the machine learning model 115 selects and provides the first exploratory content item 230a to the second user 150b on conclusion of the first typical content item 220a. Similarly, if the first typical content item 220a elicits an unexpected reaction of "neutral to", "generally disliked", or "greatly disliked" from the second user 150b, the machine learning model 115 selects and provides the second exploratory content item 230b to the second user 150b on conclusion of the first typical content item 220a. The machine learning model 115 may select different exploratory content items 230 depending on the specific unexpected reaction provided by the second user 150b to probe what about the first typical content item 220a led to the unexpected reaction, and may return to the second typical content item 220b or another point in the first pathway 210a after conclusion of the exploratory content item 230.

Continuing the example of typical content items 220 that are video files for entertainment, when the third typical content item 220c is a video that the users 150 in the first user category 135a are expected to "generally dislike" or be "neutral to", and a first user 150a indicates that the third typical content item 220c elicited a reaction of "generally dislike" or "neutral to", the machine learning model 115 provides the fourth typical content item 220d to the first user 150a on conclusion of the third typical content item 220c. In contrast, when the second user 150b indicates that the third typical content item 220c elicited a reaction other than "generally dislike" or "neutral to", the machine learning model 115 provides the third exploratory content item 230c to the second user 150b on conclusion of the third typical content item 220c. In addition to probing the second user 150b for what led to the unexpected reaction, depending on the subsequent reaction to the third exploratory content item 230c, the machine learning model 115 may reclassify the second user 150b from the first user category 135a to a second user category 135b. Accordingly, in response to receiving the reaction elicited by the third exploratory content item 230c from the second user 150b, the machine learning model 115 may provide the fourth typical content item 220d and continue providing content according to the first pathway 210a, or may provide the sixth typical content item 220f and switch to providing content according to the second pathway 210b In another use example, when the typical content items 220 are video clips provided as part of a cybersecurity survey, and the reactions indicate what a user 150 believes the video clip to exhibit (e.g., a correct response to a phishing attempt, a proper password protection scheme, an improper firewall setting, etc.), the machine learning model 115 may initially provide a first typical content item 220a to users 150 assigned to the first user category 135a of expert users and a fifth typical content item 220e to users 150 assigned to the second user category 135b of novice users. In this example, the video clips provided as the typical content items 220a-h include acted out scenarios that the users 150 react to, which allows the machine learning model 115 to identify the standing knowledge of the users 150 in relation to various cybersecurity topics, and to provide teaching moments when a user 150 is judged to have deficient knowledge in a certain area. Accordingly, a user 150 may be provided with specific training in some areas that are demonstrated as deficient, but not in areas where the user 150 is already proficient, thus improving user engagement through an improved user experience, reducing the amount of videos provided in non-relevant areas, and focusing on the user's needs for certain content items 125 rather than the user's wants for certain content items 125.

When an expert user 150 provides a series of reactions that are expected or typical for other users 150 categorized in the first user category 135a, the machine learning model 115 selects the next typical content item 220 from the first pathway 210a. Similarly, if a novice user 150 provides a series of reactions that are expected or typical for other users 150 categorized in the second user category 135b, the machine learning model 115 selects the next typical content item 220 from the second pathway 210b. However, when a user 150 provides an atypical or unexpected reaction, the machine learning model 115 selects various exploratory content items 230 to gather additional information related to the atypical reactions.

For example, when the first typical content item 220a is a video clip of Alice deciding on a new password that consists of a series of words in all lowercase letters, a typical reaction from an expert user 150 may be that this is a weak password, and an atypical reaction may be that is a strong or a good-enough password. Accordingly, the machine learning model 115 may instruct the content server 110 to provide the first exploratory content item 230a to users 150 that indicated Alice's password was sufficiently strong to identify why the users 150 thought the password was sufficiently strong (e.g., due to overall length, for use in legacy systems that do not accept special characters, for low security purposes, etc.), or to illustrate how the password is actually weak to brute force or dictionary attacks.

This exploratory content item 230 can be another video clip or a follow-up question to the video clip shown in the third typical content item 220c to gauge under what circumstances the user 150 thinks that their reaction was appropriate. The reactions received from the user 150 that are elicited by the exploratory content item 230 can then be used to update the user profile with any data that are missing, out of data, contradicted by other data, or are otherwise lacking, which can potentially cause the machine learning model 115 to re-categorize the user 150 as a novice instead of an expert, and provide content according to the second pathway 210b instead of the first pathway 210a. As used herein, a first characteristic may be considered "lacking" when the first characteristic has a null value or default value, a time since entry counter indicates that the first characteristic is out of date, that a second characteristic has a contradicting value to a value of the first characteristic, and combinations thereof.

For example, when the third typical content item 220c is a video clip of Bob asking Alice to share her new password with him, a typical reaction from an expert user 150 may be that Alice should refuse the request, while an atypical response is for Alice to accept the request and share her password. Because there are certain scenarios where password sharing may be acceptable, despite the general prohibition against sharing passwords, the machine learning model 115 may instruct the content server 110 to provide a third exploratory content item 230c to users 150 that said Alice may share her password with Bob. When the expert user 150 reacts by providing valid exceptions to the general prohibition against sharing passwords (e.g., when Bob is an information technology (IT) professional troubleshooting a problem with Alice's account, the account is a shared or organizational account, etc.), the machine learning model 115 may update the user profile 160 to indicate that the user 150 understands the nuance in the password policy, and should continue receiving typical content items 220 in the first pathway 210a for experts. However, when an "expert" user 150 reacts to the third exploratory content item 230c seeing no problem with Alice sharing her password, provides an invalid exception to the general prohibition against sharing passwords (e.g., to let Bob answer Alice's email while she is on vacation), or otherwise reacts in a way that is more typical for a novice user 150, the machine learning model 115 may update the user profile 160 to indicate that the user 150 does not understand the password policy, and should be categorized as a novice user 150 who should receive typical content items 220 in the second pathway 210b for novices.

The decision to re-categorize the user 150 on the fly or otherwise during an ongoing stream allows the content server 110 to avoid restarting a stream for the user 150 when a new user category 135 is assigned. For example, when the first typical content item 220a and the fifth typical content item 220e both relate to the same subject matter, but from different perspectives (e.g., expert vs. novice), when a user 150 is categorized after seeing the same content, the user 150 may continue the stream without viewing old content from the new perspective by continuing the stream from the third typical content item 220c to the sixth typical content item 220f rather than restarting at the fifth typical content item 220e.

Additionally, as the various users 150 are provided the content items 125, and are potentially re-categorized in the user categories 135, the machine learning model 115 may update the organizational profile 170 to identify organizational concerns. For example, if several expert users 150 are identified as indicating an unexpected "best" reaction to a password policy video clip, the organization may be alerted to change a current password policy. In another example, if a threshold number of "expert" users 150 are re-categorized as "novice" users 150, the organization may be alerted to update a training program for the users 150, implement stronger firewall protections, force a password reset, or the like.

FIGS. 3A and 3B are two-dimensional representations 300 of stored data structures used by the machine learning model 115, according to embodiments of the present disclosure. As illustrated, a first reaction 310a (generally or collectively, reaction 310) is shown in FIG. 3A and a second reaction 310b is shown in FIG. 3B, both in relation to the clusters 320a-d (generally or collectively, cluster 320) associated with four user categories 135a-d. Various distances 330a-d (generally or collectively, distance 330) from the reactions 310 to the centroid value of each cluster 320 are shown, with larger distances 330 indicating reactions 310 that are more atypical for users 150 within an associated user category 135 and smaller distances indicating reactions 310 that a more typical for users 150 within an associated user category 135.

Although discussed as two-dimensional representations 300, in various embodiments, the representations 300 may include N dimensions in a vector space that correspond to various characteristics learned about the users 150 across an organization, and may be reflected differently by responses to different content items 125. For example, users 150 may be associated with an age characteristic (of a physical age of the user 150), where older users 150 are expected to react differently to the same content item 125 than younger users 150. Additionally, users 150 may be associated with a tenure characteristic (of a length of employment of the user 150 with an organization), where more senior users 150 are expected to react differently to the same content item 125 as more junior users 150. However, when viewed as two-dimensional representations 300 of age and tenure, the machine learning model 115 may identify that users 150 with various combinations of age and seniority display distinct patterns of response, such that users 150 below age X regardless of tenure provide similar reactions to one another, users 150 between age X and age Y with zero to Z years of tenure have similar reactions to one another, users over age Y with less than Z years of tenure have similar reactions to one another, etc.

These various characteristics may interact with one another in various ways that allow the machine learning model 115 to identify users 150 with similar reaction patterns and group those users 150 into clusters 320. Using the established clusters 320, the machine learning model 115 can add users 150 with similar characteristics to a certain cluster 320 before gathering reactions to customize what content items to serve to those users 150. Using the above example, if the machine learning model 115 identifies a new user 150, whose user profile 160 lacks reaction data, but indicates that the user 150 is between X and Y years of age, the machine learning model 115 may initially or provisionally cluster that new user 150 into a user category 135 established for other users 150 who are X-Y years old with no more than Z years of experience. The machine learning model 115 may then signal the content server 110 to provide content items 125 to that new user 150 based on the user category 135. Although age and tenure are given as examples that may a various correlation to one another (e.g., younger persons tend to have lower tenure than older persons), the organizational context can specific various characteristics that are unrelated to one another based on the user base.

As reactions and data from the user profile 160 are collected and updated over time, the machine learning model 115 gains a clearer picture of how the user 150 is expected to react. Using these several data points, the machine learning model 115 can identify a clustering of the various characteristics gathered in relation to the user 150, and can identify shared behavioral patterns across several users 150 to develop clusters 320 that describe a given user category 135 that describe two or more users 150.

Because not all users 150 neatly fit into established categories, and some users 150 may grow into new categories over time, the machine learning model 115 may identify content items 125 that are associated with multiple reactions 310, where some or all of the reactions 310 are associated with different clusters 320, to adjust what user category 135 a user 150 is assigned to. Additionally or alternatively, the machine learning model 115 may assign users 150 to categories using incomplete or no profile data for that user 150, and instead identify the user category 135 that the user 150 reacts most similarly to. By tracking the similar reactions in addition to or instead of the underlying characteristics, the machine learning model 115 can group together various users 150 who behave similarly, even when the similar behaviors would be unexpected based on the underlying characteristics.

For example, a machine learning model 115 deployed on a music server to serve songs to users 150 may track how users 150 react to various songs similarly to one another and the languages that those users 150 speak. Accordingly, the machine learning model 115 can initially serve songs in language A to speakers of language A and songs in language B to speakers of language B. When a song transcends the language barrier for a certain user 150 (e.g., the user 150 reacts atypically positively to a song in a language not spoken by the user 150), the machine learning model 115 can identify other similar songs in that different language for later presentation to the user 150. The machine learning model 115 may identify a new user category 135 for users 150 that are expected to enjoy cross-language songs, and to identify the various songs (e.g., content items 125) that are expected to provide these different reactions 310 to quickly identify users 150 who only like songs in the language that the users 150 speak and those who also (or instead) like the songs in the different language.

When the machine learning model 115 identifies a content item 125 with two different reactions 310 associated with different typical/atypical reactions for two or more user categories 135, the machine learning model 115 may use that content item 125 as a probative content item 125 to help identify membership in a certain user category 135. For example, one content item 125 may be associated with both the first reaction 310*a* (shown in FIG. 3A), which is shown in the two-dimensional representations 300 within the first cluster 320*a* and outside of the other clusters 320*b-d* and a second reaction 310*b* (shown in FIG. 3B), which is shown in the two-dimensional representations 300 within the second cluster 320*b* and the third cluster 320*c*, and outside of the first cluster 320*a* and the fourth cluster 320*d*. Accordingly, the machine learning model 115 may classify the first reaction 310*a* as "typical" for the first cluster 320*a* and atypical for the second cluster 320*b*, the third cluster 320*c*, and the fourth cluster 320*d*, and the second reaction 310*b* as "typical" for the second cluster 320*b* and the third cluster 320*c*, but atypical for the first cluster 320*a* and the fourth cluster 320*d*. Accordingly, when the machine learning model 115 identifies a reaction 310 that is outside of the cluster 320 to which a user 150 is currently assigned, the machine learning model 115 can identify that a reaction 310 that is atypical for one user category 135 may be typical for another user category 135.

When determining whether a user 150 is better represented by one user category 135 out of a plurality of potential user categories 135, the machine learning model 115 may identify probative content items 125 to provide to the user 150 that have different reactions 310 associated with different clusters 320. As used herein, to be considered "probative", a content item 125 has a first reaction 310*a* that is typical for a first cluster 320*a* and atypical for a second cluster 321*b* and a second reaction 310*b* that is atypical for a first cluster 320*a* and typical for a second cluster 320*b*. For example, a content item 125 that has two potential reactions 310, represented by the first reaction 310*a* in FIG. 3A and the second reaction 310*b* in FIG. 3B can be used as a probative content item 125 between the first user category 135*a* (associated with the first cluster 320*a*) and the second user category 135*b* (associated with the second cluster 320*b*) due, in part, to the typical/atypical responses indicated in the two-dimensional representations 300. Similarly, that same content item 125 may be used as a probative content item 125 between the first user category 135*a* and the third user category 135*c*. However, the example content item 125 cannot be used as a probative content item 125 between the first user category 135*a* and the fourth user category 135*d* because the different responses do not form a typical/atypical set between the first user category 135a and the fourth user category 135d.

In various embodiments, the machine learning model 115 identifies various probative content items 125 that are associated with different clusters 320 to provide to the user 150 to help adjust how the user 150 is categorized, probe for additional information from the user 150, and select more relevant content items 125 to the user 150 (e.g., for provision as exploratory content items 230).

For example, when the machine learning model 115 determines whether to place a user 150 in a first user category 135a or a second user category 135b, rather than requesting direct values for the characteristics associated with the various categories 135 (e.g., "what is your age?", "what languages do you speak"), the machine learning model 115 may identify a probative content item 125 that has a first reaction 310a strongly associated with one user category 135 and a second reaction 310b strongly associated with the other user category 135. Thereby, the machine learning model 115 can identify what user category 135 the user 150 acts like, and can accordingly provide content items 125 to the user 150 based on behaviors rather than demographic characteristics or stated preferences.

In various embodiments, the machine learning model 115 can calculate the distances 330 using one to N of the available dimensions, and may calculate the distance 330 from a centroid value, an edge value, or a threshold value for a cluster 320. The machine learning model 115 may uses these distances 330 in conjunction with various thresholds to consider whether a given reaction 310 is typical or atypical for a given cluster 320, or if the reactions 310 for a given content item 125 can be used to differentiate the responding user 150 between two or more user categories 135.

For example, for a reaction 310 to be considered atypical, the distance 330 may need to exceed a first threshold as measured from a centroid, edge, or other measure of the cluster 320. In another example, for a reaction to be considered typical, the distance 330 may need to fall below a second threshold as measured from a centroid, edge, or other measure of the cluster 320. When the example first and second thresholds are unequal to each other, some reactions 310 that neither exceed the first threshold nor fall below the second threshold may be considered ambiguous or neither typical nor atypical for the associated user category 135. For example, the fourth distance 330d in FIG. 3A may be too large to consider the first reaction 310a to be typical for the fourth cluster 320d, but may also be too small to consider the first reaction 310a to by atypical for the fourth cluster 320d.

In some embodiments, the machine learning model 115 may identify when a content item 125 is more probative for one cluster 320 than another 320 based on the known distances 330. For example, although the content item 125 associated with the first reaction 310a and the second reaction 310b in FIGS. 3A and 3B can be used as a probative content item 125 between the first cluster 320a and either the second cluster 320b or the third cluster 320c, the machine learning model 115 may identify the associated content item 125 to be more probative for the first cluster 320a and the second cluster 320b due to the second distance 330b being more atypical (e.g., longer) than the third distance 330c in FIG. 3A and more typical (e.g., shorter) in FIG. 3B.

Additionally, the machine learning model 115 may identify a "most" probative content item 125 out of a plurality of content items 125 available from the content library 120. For example, if a first content item 125 and a second content item 125 are both probative between a first cluster 320a and a second cluster 320b, the machine learning model 115 can identify which of the two content items 125 has a combined "more typical" and "more atypical" set of reactions 310 based on the associated distances 330 (e.g., a greater average distance between the sets of reactions 310). The machine learning model 115 may then reserve the "most" probative content item 125 for provision as an exploratory content item 230 (rather than a typical content item 220) for users 150 who belong to one of the clusters 320 for which the content item 125 is probative.

Additionally, the machine learning model 115 may identify a "most" probative characteristic out of a plurality of characteristics with lacking values to differentiate what user category 135 to categorize a user 150 into. For example, when the machine learning model 115 gives a certain characteristic a higher weight than other characteristics (that may also be lacking values) in categorizing the user 150 between two or more user categories 135, that characteristic may be deemed more probative for a given categorization. For example, when the age of a user 150 and a language spoken by the user 150 lack values, the machine learning model 115 may place greater weight on the age of the user 150 in determining what songs to present as content.

Accordingly, when determining what content item 125 to provide to the user 150 to classify that user 150 into a given user category 135 (or confirm a current classification), the machine learning model 115 may identify and rank the probative value of various content items 125 based on how typical or atypical the reactions 310 are for candidate user categories 135 and the characteristics for which data are collected. The machine learning model 115 may thereby select a content item 125 that is both highly differentiable between the different reactions 310 and in a dimension or characteristic that is relevant (and currently lacking) to determine what user category 135 the user 150 should belong to. In various embodiments, the machine learning model 115 is trained to balance these considerations according to different goals or organizational contexts to prioritize data gathering for lacking characteristics over user category differentiation or vice versa in different scenarios.

FIG. 4 is a flowchart of a method 400 for identifying when and what exploratory content to provide in an ongoing content sequence, according to embodiments of the present disclosure. Method 400 begins at block 410, where the machine learning model 115 receives or accesses a user profile 160 that is incomplete. In various embodiments, the user profile 160 may be incomplete due to data not previously entered for a characteristic, data that have timed out or that has otherwise been removed for a characteristic, and data that have been contradicted or otherwise rendered unreliable by other data. For example, the user profile 160 may lack a value for the characteristic because a user 150 may have skipped entry of the value, or because the value for the characteristic is considered valid for X months and the machine learning model 115 assigned the value more than X months ago. In another example, the user profile 160 may lack a value for the characteristic because the user profile 160 includes a value for second characteristic that lowers confidence in the accuracy of the value of a first characteristic, such as when the user 150 has reacted atypically to a previously served content item 125.

At block 420, the machine learning model 115 identifies a content item 125 that is associated with multiple user categories 135 to serve to the user 150 based on the user profile 160 for that user 150. In various embodiments, the identified content item 125 is selected as a probative content item 125 with the user category 135 that the user 150 is currently categorized into and a different user category 135 that the user is not currently categorized into. In various embodiments, the different user category 135 is identified based on sharing a characteristic with the current user category 135 or as a user category 135 for which an atypical reaction in the current user category 135 is a typical reaction for the different user category 135.

At block 430, the machine learning model 115 signals the content server 110 to provide the content item 125 (selected per block 420) to the user 150. In various embodiments, the content server 110 provides the selected content item 125 as part of a stream or series of content items 125 to the user 150 that is potentially adjusted as the user 150 reacts to the content items 125. Accordingly, the content item 125 provided by the content server 110 per block 430 may be a first content item 125 that the machine learning model 115 provides to the user 150 a current session, or may be a subsequent content item 125.

At block 440, the machine learning model 115 receives a reply from the user 150 indicating what reaction the content item 125 (selected per block 420) elicited from the user 150, and updates the user profile 160 accordingly. In various embodiments, the reply can indicate various different reactions (e.g., like/dislike, agree/disagree, option A/B/C/D, etc.) depending on the context of the content item 125 and the data that that the machine learning model 115 is attempting to extract from the user 150 to build or update the characteristics lacking from the user profile 160. In various embodiments, the content server 110 may pause or delay selection and provision of the subsequent content item 125 in the stream or series until a reply from the user 150 is received that indicates what reaction the previous content item 125 elicited from the user 150.

The machine learning model 115 updates the user profile 160 to avoid re-serving the same content item 125 (within a designated timeframe) and to update any values for characteristics that were previously lacking that the reaction provides related data for. For example, when a characteristic of where a user 150 is located is lacking (e.g., factory A, factory B, or factory C), and the reaction is differentiable between various values (e.g., persons in factory A historically react differently from persons in factory B or C), the machine learning model 115 updates the characteristic accordingly (e.g., increasing or decreasing a likelihood that the person is located at factory A).

At block 450, the machine learning model 115 determines whether the reaction (received per block 440) is an expected or typical reaction for the current user category 135 that the user 150 is assigned to, or is otherwise unexpected or atypical. For example, when the reaction (received per block 440) is historically associated with other users 150 who also belong to the current user category 135, the machine learning model 115 determines that the reaction is expected or typical for the current user category 135, and method 400 proceeds to block 460. Otherwise, when the machine learning model 115 determines that the reaction (received per block 440) is unexpected or atypical for the current user category 135, method 400 proceeds to block 470.

At block 460, the machine learning model 115 identifies the next content item 125 in the stream or series of content items 125 to provide to the user 150. For example, when the user 150 belongs to a first user category 135a that is provided typical content items 220 according to a first content pathway 210a, the machine learning model 115 may select the next typical content item 220 in the first content pathway 210a. In various embodiments, the typical content items 220 that make up a content pathway 210 may be curated in a particular order, or may be selected from a pool of potential typical content items 220 based on being probative for the current user category 135 and at least one other user category 135 or having a reaction associated with a characteristic that is missing from the current user profile 160.

In some embodiments, when the reaction elected from a probative content item 125 in the latest iteration of block 440 is determined to be typical for the currently assigned user category 135 and atypical for a (first) different user category 135 under consideration, the machine learning model 115 selects the next content item 125 to be probative to a (second) different user category 135. For example, when the first content item 125 is probative between a currently assigned first user category 135a and a second user category 135b, and method 400 proceeds to block 460 in response to the reaction being typical for the first user category 135a, the machine learning model 115 selects the next content item 125 to be probative between the still-current first user category 135a and a third user category 135c. Accordingly, the machine learning model 115 ensures that the content items 125 are probing for a variety of characteristics without being needlessly repetitive.

For example, when the machine learning model 115 does not know (or does not trust based on current data) a tenure characteristic used to determine whether a certain user 150 is an expert or a novice technician, the machine learning model 115 may select a content item 125 that is probative between an "expert" first user category 135a and a "novice" second user category 135b to determine how to select content items 125 appropriate for the technical skill of the user 150. However, once the machine learning model 115 establishes that the user 150 reacts to the content items 125 the way that an expert would, the machine learning model 115 may switch to providing content items 125 that probe whether the user 150 reacts like a member of a management team, a manufacturing team, or a research team.

At block 470, the machine learning model 115 identifies the next content item to explore the atypical reaction (received per block 440). For example, when the user 150 belongs to a first user category 135a that is provided typical content items 220 according to a first content pathway 210a, the machine learning model 115 may select an exploratory content item 230 to next provide to the user 150.

In various embodiments, the exploratory content item 230 may be selected as a follow up probative content item 125 between the currently assigned first user category 135a for which the reaction (received per block 440) was atypical and a different second user category 135b for which that reaction is typical. In some embodiments, the exploratory content item 230 may be selected as a follow up probative content item 125 between two or more different user categories 135 for which the reaction (received per block 440) is typical. This follow up probative content item 125 may then be used to reassign the user 150 to the new user category 135 and track how groups of users 150 reactions interact in aggregate and change over time. Once reassigned to a new user category 135, the machine learning model 115 adjusts the provision of ongoing content items 125 to be more appropriate for users 150 classified in the new user category 135.

At block 480, the machine learning model 115 signals the content server 110 to provide the subsequent content item 125 (selected per block 460 or block 470) to the user 150. In various embodiments, the content server 110 provides the selected content item 125 as part of a stream or series of content items 125 to the user 150 that is potentially adjusted as the user 150 reacts to the content items 125. The machine learning model 115 and the content server 110 provide the content items 125 to the user 150 without receiving selective inputs from the user 150 for which content item 125 to provide next.

Method 400 may conclude once the last content item 125 in the stream or series is provided to the user 150, the user 150 supplies the last reaction to the last content item 125, the user 150 or another party terminates a content consumption session, or the like.

FIG. 5 is a flowchart of a method 500 for identifying norms for a user category 135 against which reactions from individual users are tracked, according to embodiments of the present disclosure. Method 500 begins at block 510, where the machine learning model 115 identifies a user category 135 that a user 150 belongs to. For example, when conducting a survey on organizational behavior patterns, users 150 in a manufacturing environment may have different norms than users 150 in a datacenter, and the machine learning model 115 may accordingly maintain different user categories 135 for manufacturing workers versus data center workers.

At block 520, the machine learning model 115 identifies the distribution of historical reactions to a certain content item 125 for the user category 135 identified per block 510. The historical reactions can include reactions from users 150 belonging to different organizational profiles 170, and may be curated to include all available historical reactions or a rolling window (e.g., the historical reactions received in the last X months).

In various embodiments, the historical reactions can be from other users 150 who also (at the time when the historical reaction was received) belong to the identified user category 135 (within a shared organization or across organizations). Additionally, the historical reactions can be from other users 150 who (at the time when the historical reaction was received) belonged to different user categories 135 than the identified user category 135. In various embodiments, these different user categories 135 are related to the identified user category 135 as opposite categories (e.g., novice users vs. expert users) according to one or more characteristics expected to have opposing reactions or as partially overlapped categories that may share similarities in reactions based on one or more characteristics (e.g., clusters 320 that overlap in a vector space using the characteristics as dimensions).

The distributions of historical reactions identify how often users 150 (who the machine learning model 115 identified as related to the identified user category 135) provided various reactions to individual content items 125 available from the content library 120. In various embodiments, block 520 may be omitted from method 500 when the machine learning model 115 identifies that the number of historical reactions to the content item 125 fall below a threshold number (e.g., for a new content item 125).

At block 530, the machine learning model 115 identifies the atypical reactions based on one or more of the historical distributions and typicality thresholds. In various embodiments, the typicality thresholds are set according to a percentile or a standard deviation range so that reactions that are seen infrequently (or never) according to the distribution threshold and/or operator-supplied distributions are classified as atypical reactions, while other reactions are classified as typical reactions. In various embodiments, the typicality threshold can identify a reaction as atypical when at least X % of the historical reactions were not the identified reaction, when no more than X of the last Y users 150 provided historical reactions of a specified value, when a reaction is in the $X^{th}$ percentile of the user base, etc.

For example, when conducting a survey to determine inclusivity in an organization, a content item 125 may present a scenario where Alice, Bob, and Carol each present proposals to solve a network outage that the user 150 is to react to by selecting which solution to try first. In this example, Alice and Bob are coded (e.g., via appearance, speech, etc.) to be part of the user category 135 that the user 150 belongs to, but only Bob and Carol give "correct" solutions the network outage, while Alice presents an "incorrect" solution. In various embodiments, historical reactions from the experienced users 150 may rarely identify Alice's proposal as the best to try first, and more frequently identify one of Bob or Carol's solutions to try first. Accordingly, if the number of selections for Alice's solution out of the total number of selections falls below a percentile set by the typicality threshold, any future user 150 who reacts by selecting Alice's proposal may be considered to provide an atypical reaction to the content item 125 in question.

At block 540, the machine learning model 115 extracts group norms from the historical reactions. Continuing the example, of Alice, Bob, and Carol, the machine learning model 115 can draw different inferences based on the different historical reactions to selecting between Bob and Carol's "correct" solutions. For example, if the users 150 historically have (approximately) evenly selected Bob and Carol's proposals (e.g., rendering neither Bob nor Carol's proposals atypical according to the typicality threshold), the machine learning model 115 can identify that the norm within the user category 135 is egalitarian consideration between "correct" solutions. However, if the users 150 historically prefer selecting Bob's proposal over Carol's (e.g., rendering Carol's proposal an atypical reaction according to the typicality threshold), the machine learning model 115 may identify that the user category 135 displays in-group favoritism. In contrast, if the users 150 historically prefer selecting Carol's proposal (e.g., rendering Bob's proposal an atypical reaction according to the typicality threshold), the machine learning model 115 may identify that the user category 135 displays noted attempts for out-group inclusivity.

At block 550, the machine learning model 115 updates the organizational profile 170 associated with the user category 135 with the norms identified per block 540. The machine learning model 115 may track various norms across different sub-groups associated with an organizational profile 170 to identify differences in expected reactions between different sets of users 150 (e.g., whether users 150 located at facility A react differently than users 150 at facility B, whether users 150 in manufacturing roles react the same as users 150 in IT support roles, etc.). In various embodiments, the machine learning model 115 may generate alerts when the organizational profile 170 includes sub-groups with different norms (e.g., indicating mismatched behavioral patterns) or when a norm changes due to updates in reactions (e.g., indicating effective training, indicating an incident affecting the behavior of the user base, etc.). Accordingly, the machine learning model 115 can extract additional organizational information from otherwise purely technical reaction inputs received from individuals.

At block 560, the machine learning model 115 receives a desired reaction distributions for the user category 135 identified per block 510. In various embodiments, block 560 may be omitted from method 500, but when included, the machine learning model 115 receives operator-specified frequencies for the various reactions that a certain content item 125 should elicit from the users 150 of the identified user category 135 (e.g., based on analysis of the organizational profile 170). In various embodiments, the desired reaction distributions can be used when not enough historical reactions have been received to establish a statistically significant determination of typical or atypical reactions (e.g., when block 520 is omitted). In some embodiments, the desired reaction distributions can identify mandated changes to reaction patterns (e.g., when the historical reactions are based on compliance with old policies, when the existing norms are undesirable, etc.).

Additionally or alternatively, the operator-specified desired reaction distributions can identify various reactions that, even if atypical, are not of concern to the operator and should not result in follow up actions (e.g., reactions to "request additional data", reactions judged to be "good" where the norm is judged to be "bad"). Similarly, the operator-specified desired reaction distributions can identify various reactions that, even if typical, are of concern to the operator and should result in follow up actions (e.g., reactions that match a norm that the operator identifies as counter to established policies or goals).

At block 570, the machine learning model 115 links a follow up action for the identified content item 125 based on the potential reactions. For example, when a reaction is identified as atypical for a first user category 135*a*, but typical for a second user category 135*b*, the machine learning model 115 may identify an exploratory content item 125 related to both user categories 135 that should be provided as a follow up to the first atypical reaction. In another example, the machine learning model 115 may set a feedback request as a follow up reaction to receive at least one of a quality assessment or a preference assessment of the content item to see if the user 150 was confused by the content item 125 or reacted unexpectedly due to an external factor (e.g., dialog not understandable). In a further example, when the reaction is identified as typical, the machine learning model 115 may identify a next typical content item 220 to provide to a user 150 belonging to the identified user category 135.

For example, the machine learning model 115 links the follow up actions for atypical reactions elicited by a content item 125 from users 150 belonging to a first user category 135 (where the reaction is typical for a user 150 of a second user category 135*b*) to exploratory content items 230. These exploratory content items 230 may be associated with a first reaction that is identified as a typical reaction from users 150 belonging to a current first user category 135*a* and that is identified as atypical for a second user category 135*b* or vice versa (e.g., the first reaction is atypical for the first user category 135*a* and typical for the second user category 135*b*). Other follow up actions (e.g., requesting feedback input, adjusting flow through a pathway 210 of content, adjusting a user profile 160) are also contemplated.

In another example, the machine learning model 115 links the follow up actions for typical reactions elicited by a content item 125 from users 150 belonging to a first user category 135 to typical content items 220 in a pathway 210 of content.

In various embodiments, when linking the follow up action, the machine learning model 115 may identify the subsequent content item 125 to provide for each reaction to an earlier content item 125 (e.g., as part of a curated stream of content items 125), or may insert a trigger to select (e.g., at the time on content provision) an appropriate content item 125 from the content library 120 that corresponds to the reaction elicited from the user 150.

At block 580, the machine learning model 115 provides the subsequent content item 125 in response to the conclusion of an earlier content item 125 according to the linked follow up actions. In various embodiments, when the reaction elicited from the user 150 by the earlier content item 125 is atypical, the machine learning model 115 provides an exploratory content item 230 to the user 150. In various embodiments, when the reaction elicited from the user 150 by the earlier content item 125 is typical, the machine learning model 115 provides a typical content item 220 to the user 150.

FIG. 6 is a flowchart of a method 600 for reacting to changes in categorization of the users 150 while serving an ongoing content stream, according to embodiments of the present disclosure. Method 600 begins at block 610, where a machine learning model 115 identifies a current user category 135 that a user 150 belongs to. In various embodiments, the user 150 is assigned to one user category 135 of a plurality of potential user categories 135 based on a user profile 160 that the machine learning model 115 maintains, and which may lack a value (or certainty in a value) for one or more characteristics for the user 150 or be a complete profile.

At block 620, the machine learning model 115 identifies an organizational profile 170 for a group or subgroup that the user 150 belongs to. In various embodiments, the machine learning model 115 stores the distribution of users 150 and associated user categories 135 (identified per block 610) in the organizational profile 170 to track that there are X users 150 in a first user category 135*a*, Y users 150 in a second user category, Z users in a third user category 135*c*, etc., the relative distributions of users 150 in the various user categories 135 (e.g., X % of users 150 in a corresponding group are members of the first user category 135*a*), whether there are any user categories 135 that users 150 should be steered to or away from (e.g., to identify content from training regimens to provide), whether there are any user categories 135 that users 150 should be checked against (e.g., to confirm various user characteristics), and combinations thereof.

At block 630, the machine learning model 115 selects a content item 125 to provide to a user 150 based on the currently assigned user category 135 and any organizational context provided by the organizational profile 170.

For example, an organizational profile 170 may indicate that 75% of the users 150 are classified in a "novice" first user category 135*a*, the remaining 25% of users 150 are classified in an "expert" second user category 135*b*, and that more users 150 are desired to be in the "expert" second user category 135*b*. Accordingly, the machine learning model 115 may use this organizational context to identify that content items 125 related to checking or improving the technical skills of the novice users 150 may be desired. Therefore, when the user 150 is identified as a member of the first user category 135*a*, the machine learning model 115 may select a content item 125 to teach or convey various basic technical skills, and when the user 150 is identifies as a member of the second user category 135*b*, the machine learning model 115 may select a different content item 125 to test existing technical skills or teach or convey various advanced technical skills.

In another example, an organizational profile 170 may indicate that all users 150 should be up-to-date on cybersecurity policies as members of an "expert" user category 135, but operational readiness should be periodically confirmed. Accordingly, the machine learning model 115 may use this organizational context to identify content items 125 related to checking or reconfirming that the users 150 remember more basic concepts in addition to providing content items 125 customized for expert users 150 to teach or convey advanced technical skills.

When selecting the content item 125 to provide to the user 150, the machine learning model 115 may identify various probative characteristics that, if additional data were collected for, could help categorize the user 150 into a certain user category 135 or otherwise provide more relevant content items 125 to the user 150. Additionally or alternatively, the machine learning model 115 may select content items 125 that are probative between two or more user categories 135 that the user 150 is a potential member in based on previous reactions, known user characteristics, and combinations thereof.

At block 640, the machine learning model 115 provides the content item 125 (selected per block 630) to the user 150. The machine learning model 115 may signal the content server 110 or the content library 120 to combine two or more content items 125 together for provision to the user 150, and may provide various different content items 125 in parallel to different users 150.

At block 650, the machine learning model 115 receives a reply from a user 150 indicating the reaction elicited from the content item 125 provided per block 640. The user device 140 that provides the content item 125 to the user 150 may collect various reaction data via user interfaces, facial recognition, speech recognition, biometric monitoring, time monitoring, and combinations thereof, that the machine learning model 115 uses as a reaction input.

In various embodiments, the machine learning model 115 may also receive separate feedback from the user 150 related to the content item 125 including various quality assessments and preference assessments related to the provided content item 125. In various embodiments, the machine learning model 115 uses the feedback from the user 150 to augment the reaction inputs.

For example, the machine learning model 115 may treat a reaction as less atypical (or less typical) if the user 150 provides feedback indicating that the content item 125 was confusing, and may treat a reaction as more atypical (or more typical) if the user 150 provides feedback indicating that the content item 125 was clear or otherwise not confusing. In another example, the feedback may be used with the reactions to identify whether the reactions are authentic or being faked or "gamed" by the user 150. Accordingly, when the reaction is a response to a question posed in relation to a just-provided video clip, and the user 150 submits an answer faster than X milliseconds, the machine learning model 115 may using the timing information as feedback that the user 150 is guessing instead of reacting authentically, and may treat the response as unreliable or atypical despite the reaction nominally being typical.

At block 660, the machine learning model 115 updates the user profile 160 based on the reaction. As the user 150 provides additional reactions to the various content items 125, the machine learning model 115 can update various values for characteristics associated with those content items 125. For example, a first content item 125 may be associated with characteristics for location (e.g., users 150 at location A tend to have first reaction while users 150 at location B tend to have a second reaction), level of expertise (e.g., expert users 150 tend to have the first reaction while novice users 150 tend to have a third reaction) such that a user 150 who submits that the content item 125 elicited the first reaction is more strongly associated with a user categories 135 for expert users 150 and users 150 at location A than before the reaction was submitted. These associations may be based on training data (e.g., matched to responses from users 150 known to have a certain value for a characteristic) or may be hardcoded by a developer of the machine learning model 115. The amount of change to the user profile 160 may be based at least on the weight ascribed by the machine learning model 115 for how typical/atypical a certain reaction is, any feedback received in addition to the reaction, or combinations thereof.

At block 670, the machine learning model 115 determines whether the updates to the user profile 160 result in a change in assigned user category 135. The characteristics stored in the user profile 160 represent a collective reaction pattern learned from a user 150 over time. Although a single reaction (and corresponding updates to associated characteristics) may be sufficient to shift a user 150 from an initial user category 135 to a subsequent user category 135 in some cases, a single reaction may not always be sufficient to change the assigned user category 135. Accordingly, the machine learning model 115 may, after receiving one reaction atypical for the initial user category 135, follow up with an exploratory content item 230 related to at least one of the updated characteristics or that is probative between the initial user category 135 and another user category 135 for which the reaction is typical. Accordingly, in some embodiments, the machine learning model 115 waits to change the assigned user category 135 until a reaction elicited from an exploratory content item 230 is received from the user 150.

By identifying the atypical reaction and quickly following up with an exploratory content item 230, the machine learning model 115 can better and more quickly identify whether the atypical reactions are aberrations, errors, or minor differences in the reaction pattern of the user 150 compared to the historical reactions that the current user category 135 is based on or are evidence of a fundamental difference or change in the reaction pattern of the user 150 that are deserving of reassignment to a different user category 135. The exploratory content item 230 provides confirmation (or denial) of the atypical reaction from an earlier-consumed content item 125 in a sequence provided to the user 150, and allows the machine learning model 115 to select a different pathway 210 of content items 125 to provide to the user 150 via the content server 110 and content library 120. Accordingly, the machine learning model 115 is able to explore how to better serve content relevant to the user 150 without relying on randomly selected content items 125, and to provide the exploratory content items 230 at a relevant time to probe the atypical reaction, and thereby more quickly adjust what content items 125 are served to the user 150, such as is described in relation to method 400 from FIG. 4.

At block 680, the machine learning model 115 updates the organizational profile 170 based on the updated user profile 160. The updated organizational profile 170 reflects the newly reassigned user category 135 for the user 150, and may include changes in user category assignments for several other users 150 part of the same group.

At block 690, the machine learning model 115 generates an alert that the user 150 has been reassigned to a new user category 135. In various embodiments, the alert signals the machine learning model 115 to change the typical content items 220 that are provided to the user 150 in an ongoing stream or sequence of content items 125 to reflect the new user category 135 for the user 150. Additionally, the alert can indicate when a number of users 150 have been re-categorized from an undesirable user category 135 to a more desirable user category 135 satisfy a reassignment threshold (e.g., meeting an organizational goal), when a user 150 is re-categorized into a less desirable user category 135 (e.g., identifying a backslide or training opportunity), or the like.

Method 600 may conclude once the last content item 125 in the stream or sequence is provided to the user 150, the user 150 supplies the last reaction to the last content item 125, the user 150 or another party terminates a content consumption session, or the like.

FIG. 7 illustrates physical components of an example computing device 700 according to embodiments of the present disclosure. The computing device 700 may include at least one processor 710, a memory 720, and a communication interface 730.

The processor 710 may be any processing unit capable of performing the operations and procedures described in the present disclosure. In various embodiments, the processor 710 can represent a single processor, multiple processors, a processor with multiple cores, and combinations thereof.

The memory 720 is an apparatus that may be either volatile or non-volatile memory and may include RAM, flash, cache, disk drives, and other computer readable memory storage devices. Although shown as a single entity, the memory 720 may be divided into different memory storage elements such as RAM and one or more hard disk drives. As used herein, the memory 720 is an example of a device that includes computer-readable storage media, and is not to be interpreted as transmission media or signals per se.

As shown, the memory 720 includes various instructions that are executable by the processor 710 to provide an operating system 722 to manage various functions of the computing device 700 and one or more programs 724 to provide various functionalities to users of the computing device 700, which include one or more of the functions and functionalities described in the present disclosure. One of ordinary skill in the relevant art will recognize that different approaches can be taken in selecting or designing a program 724 to perform the operations described herein, including choice of programming language, the operating system 722 used by the computing device, and the architecture of the processor 710 and memory 720. Accordingly, the person of ordinary skill in the relevant art will be able to select or design an appropriate program 724 based on the details provided in the present disclosure.

Additionally, the memory 720 can include one or more of machine learning models 726 (e.g., the machine learning model 115) for behavioral recognition and analysis, as described in the present disclosure. As used herein, the machine learning models 726 may include various algorithms used to provide "artificial intelligence" to the computing device 700, which may include Artificial Neural Networks, decision trees, support vector machines, genetic algorithms, Bayesian networks, or the like. The models may include publically available services (e.g., via an Application Program Interface) as well as purpose-trained or proprietary services. One of ordinary skill in the relevant art will recognize that different domains may benefit from the use of different machine learning models 726, which may be continuously or periodically trained based on received training data. Accordingly, the person of ordinary skill in the relevant art will be able to select or design an appropriate machine learning model 726 based on the details provided in the present disclosure.

The communication interface 730 facilitates communications between the computing device 700 and other devices, which may also be computing devices 700 as described in relation to FIG. 7. In various embodiments, the communication interface 730 includes antennas for wireless communications and various wired communication ports. The computing device 700 may also include or be in communication, via the communication interface 730, one or more input devices (e.g., a keyboard, mouse, pen, touch input device, etc.) and one or more output devices (e.g., a display, speakers, a printer, etc.).

Embodiments may be implemented as a computer process (method), a computing system, or as an article of manufacture, such as a computer program product or computer-readable storage medium. The computer program product may be a computer-readable storage medium readable by a computer system and encoding a computer program of instructions for executing a computer process. Accordingly, hardware or software (including firmware, resident software, micro-code, etc.) may provide embodiments discussed herein. Embodiments may take the form of a computer program product on a computer-usable or computer-readable storage medium having computer-usable or computer-readable program code embodied in the medium for use by, or in connection with, an instruction execution system.

Although embodiments have been described as being associated with data stored in memory and other storage media, data can also be stored on or read from other types of computer-readable media, such as secondary storage devices, like hard disks, floppy disks, or a CD-ROM, or other forms of RAM or ROM. The term "computer-readable storage medium" refers only to devices and articles of manufacture that store data or computer-executable instructions readable by a computing device. The term "computer-readable storage medium" does not include computer-readable transmission media.

Embodiments described in the present disclosure may be used in various distributed computing environments where tasks are performed by remote processing devices that are linked through a communications network.

The systems, devices, and processors described herein are provided as examples; however, other systems, devices, and processors may comprise the aforementioned memory storage and processing unit, consistent with the described embodiments.

The descriptions and illustrations of one or more embodiments provided herein are intended to provide a thorough and complete disclosure the full scope of the subject matter to those of ordinary skill in the relevant art and are not intended to limit or restrict the scope of the subject matter as claimed in any way. The embodiments, examples, and details provided in this disclosure are considered sufficient to convey possession and enable those of ordinary skill in the relevant art to practice the best mode of the claimed subject matter. Descriptions of structures, resources, operations, and acts considered well-known to those of ordinary skill in the relevant art may be brief or omitted to avoid obscuring lesser known or unique embodiments of the subject matter of this disclosure. The claimed subject matter should not be construed as being limited to any embodiment, aspect, example, or detail provided in this disclosure unless expressly stated herein. Regardless of whether shown or described collectively or separately, the various features (both structural and methodological) are intended to be selectively included or omitted to produce an embodiment with a particular set of features. Further, any or all of the functions and acts shown or described may be performed in any order or concurrently.

Having been provided with the description and illustration of the present disclosure, one of ordinary skill in the relevant art may envision variations, modifications, and alternate embodiments falling within the spirit of the broader embodiments of the general inventive concept provided in this disclosure that do not depart from the broader scope of the present disclosure.

As used in the present disclosure, a phrase referring to "at least one of" a list of items refers to any set of those items, including sets with a single member, and every potential combination thereof. For example, when referencing "at least one of A, B, and C" or "at least one of A, B, or C", the phrase is intended to cover the sets of: A, B, C, A-B, B-C, and A-B-C, where the sets may include one or multiple instances of a given member (e.g., A-A, A-A-A, A-A-B, A-A-B-B-C-C-C, etc.) and any ordering thereof.

As used in the present disclosure, the term "determining" encompasses a variety of actions that may include calculating, computing, processing, deriving, investigating, looking up (e.g., via a table, database, or other data structure), ascertaining, receiving (e.g., receiving information), accessing (e.g., accessing data in a memory), retrieving, resolving, selecting, choosing, establishing, and the like.

The following claims are not intended to be limited to the embodiments shown herein, but are to be accorded the full scope consistent with the language of the claims. Within the claims, reference to an element in the singular is not intended to mean "one and only one" unless specifically stated as such, but rather as "one or more" or "at least one". Unless specifically stated otherwise, the term "some" refers to one or more. No claim element is to be construed under the provision of 35 U.S.C. § 112 (f) unless the element is expressly recited using the phrase "means for" or "step for". All structural and functional equivalents to the elements of the various embodiments described in the present disclosure that are known or come later to be known to those of ordinary skill in the relevant art are expressly incorporated herein by reference and are intended to be encompassed by the claims. Moreover, nothing disclosed in the present disclosure is intended to be dedicated to the public regardless of whether such disclosure is explicitly recited in the claims.

I claim:

1. A system, comprising:
   a content library including a plurality of content items;
   a profile database including a user profile associated a user; and
   a content server including a machine learning model trained to select content items of the plurality of content items from the content library for provision to the user based on the user profile by performing operations comprising:
   identifying, via the machine learning model, a current user category out of a plurality of user categories that the user currently belongs to, wherein the user profile is lacking a characteristic associated by the machine learning model with the current user category;
   selecting, via the machine learning model, a first content item from the plurality of content items based on the current user category and the characteristic lacking from the user profile;
   providing the first content item to the user;
   in response to completing provision of the first content item to the user, receiving a first reply indicating what reaction the first content item elicited from the user;
   updating, via the machine learning model, the user profile to an updated user profile based on a value for the characteristic associated with the reaction elicited from the user by the first content item;
   identifying, via the machine learning model, a second content item from the plurality of content items based on the updated user profile; and
   providing the second content item to the user.

2. The system of claim 1, wherein the machine learning model identifies the characteristic as lacking based on at least one of:
   the characteristic having a null value or default value;
   a time since entry counter indicated that the characteristic is out of date; and
   a second characteristic having a contradicting value to a value of the characteristic.

3. The system of claim 1, wherein selecting the first content item further comprises:
   identifying a subset of content items from the plurality of content items that are historically associated with reactions of a first value from users belonging to the current user category and of a second value, different from the first value, from users belonging to a different user category, wherein the first value and the second value are associated with the characteristic.

4. The system of claim 3, wherein the first content item is selected from the subset of content items from the plurality of content items based, at least in part, on:
   the first content item being associated by the machine learning model with a greater average distance in a vector space for the first value and the second value between the current user category and the different user category than corresponding values from other content items of the plurality of content items.

5. The system of claim 3, wherein the machine learning model updates the user profile to the updated user profile in response to the first reply indicating that the reaction elicited from the user by the first content item falls outside of a first threshold as being an unexpected reaction relative to a first plurality of historical reactions from other users belonging to the current user category and within a second threshold as being an expected reaction relative to a second plurality of historical reactions from other users belonging to the different user category.

6. The system of claim 1, wherein the operations further comprise:
   identifying a distribution of a plurality of users, including the user, among the plurality of user categories;
   identifying, by the machine learning model, a stream of content items to present to each user the plurality of users based on the distribution; and
   providing the stream of content items to the plurality of users.

7. The system of claim 6, wherein the operations further comprise:
   identifying a number of individual users of the plurality of users that are reclassified from an initial user category to a subsequent user category during provision of the stream of content items, including the user that was reclassified from the current user category to the subsequent user category; and
   in response to the number exceeding a reassignment threshold, generating an alert.

8. The system of claim 1, wherein the first content item and the second content item are provided in a stream of content items selected by the machine learning model without selective input from the user.

9. The system of claim 1, wherein the operations further comprise:

requesting a feedback input from the user related to at least one of a quality assessment of the first content item and a preference assessment of the first content item.

10. A method, comprising:
receiving a user profile associated with a user, wherein the user profile is incomplete;
identifying, via a machine learning model according to the user profile, a first content item from a plurality of content items, wherein the first content item is historically associated with:
   a first reaction from users classified with a first user category that the user belongs to according to the user profile, and
   a second reaction from users classified within a second user category that the user does not belong to according to the user profile;
providing the first content item to the user;
receiving a reply from the user indicating which one of the first reaction or the second reaction the first content item elicited from the user; and
in response to the reply indicating that the first content item elicited the second reaction from the user, identifying, via the machine learning model, a second content item from the plurality of content items, wherein the second content item is identified from the plurality of content items as being associated with probative reactions related to a probative characteristic missing from the user profile used by the machine learning model to classify the user between the first user category and the second user category.

11. The method of claim 10, further comprising:
providing the second content item to the user;
receiving a second reply from the user indicating a second reaction elicited from the user by the second content item;
updating the user profile with a value for the probative characteristic based on the reply; and
classifying the user based on the updated user profile to one of the first user category and the second user category.

12. The method of claim 11, further comprising:
identifying, via the machine learning model, a third content item based on the updated user profile; and
providing the third content item to the user, wherein the first content item, the second content item, and the third content items are video clips selected by the machine learning model for provision to the user without receiving selective input from the user.

13. The method of claim 10, wherein the probative characteristic is a characteristic that is given a greater weight by the machine learning model from among a plurality of lacking characteristics to categorize the user into one of the first user category and the second user category.

14. The method of claim 10, wherein the machine learning model classifies the user into the first user category when the probative characteristic is assigned a first value and classifies the user into the second user category when the probative characteristic is assigned a second value, different than the first value, wherein:
   the first value is associated with a first reaction to the first content item historically elicited from users classified within the first user category, and
   the second value is associated with a second reaction to the first content item, different from the first reaction, historically elicited from users classified within the second user category.

15. A method, comprising:
identifying, via a machine learning model, a user who can be assigned to one of a first user category or a second user category based on a user profile associated with the user, wherein the user profile is incomplete;
identifying a probative characteristic that is missing from the user profile, wherein the machine learning model classifies the user into the first user category when the probative characteristic is assigned a first value and classifies the user into the second user category when the probative characteristic is assigned a second value, different than the first value, wherein:
   the first value is associated with a first reaction from users classified within the first user category, and
   the second value is associated with a second reaction from users classified within the second user category;
identifying a content item from a plurality of content items that is historically associated eliciting one of the first reaction or the second reaction; and
providing the content item to the user.

16. The method of claim 15, further comprising:
receiving a reply from the user indicating which one of the first reaction or the second reaction the content item elicited from the user;
updating the user profile with one of the first value or the second value for the probative characteristic based on the reply;
reclassifying the user based on the updated user profile;
identifying, via the machine learning model, a second content item based on the updated user profile; and
providing the second content item to the user.

17. The method of claim 15, wherein the user is identified in response to:
providing the user with an initial content item when the user is provisionally associated with the first user category based on the user profile;
receiving an initial reaction from the user elicited by the initial content item; and
determining, via the machine learning model, that the initial reaction is historically associated more strongly with the second user category than with the first user category.

18. The method of claim 17, wherein the initial content item and the content item are provided in a stream of content items selected by the machine learning model without selective input from the user.

19. The method of claim 15, wherein the content item is identified from the plurality of content items based, at least in part, on:
the content item being associated with a highest probative reaction between the first user category and the second user category among the plurality of content items available for provision to the user.

20. The method of claim 15, wherein the content item is a video clip selected from a library of video clips that the user has not yet been provided for viewing.

* * * * *